United States Patent
Krishna et al.

(10) Patent No.: US 10,348,661 B2
(45) Date of Patent: Jul. 9, 2019

(54) UNIFIED SERVER FOR MANAGING A HETEROGENEOUS MIX OF DEVICES

(71) Applicants: Vikas Krishna, San Jose, CA (US); Timothee Bailloeul, Sunnyvale, CA (US)

(72) Inventors: Vikas Krishna, San Jose, CA (US); Timothee Bailloeul, Sunnyvale, CA (US)

(73) Assignee: Ricoh Company, Ltd., Tokyo (JP)

(*) Notice: Subject to any disclaimer, the term of this patent is extended or adjusted under 35 U.S.C. 154(b) by 374 days.

(21) Appl. No.: 14/614,191

(22) Filed: Feb. 4, 2015

(65) Prior Publication Data

US 2015/0149478 A1 May 28, 2015

Related U.S. Application Data

(63) Continuation of application No. 13/689,752, filed on Nov. 29, 2012, now Pat. No. 9,363,214.

(51) Int. Cl.
*H04L 29/08* (2006.01)
*H04L 12/58* (2006.01)
(Continued)

(52) U.S. Cl.
CPC .......... *H04L 51/066* (2013.01); *G06F 1/329* (2013.01); *G06F 16/41* (2019.01); *G06F 16/43* (2019.01);
(Continued)

(58) Field of Classification Search
CPC ............. H04L 51/066; H04L 12/5835; H04L 12/5895; H04L 65/60; H04L 12/1818;
(Continued)

(56) References Cited

U.S. PATENT DOCUMENTS 5,550,966 A * 8/1996 Drake .................. G06T 11/00
6,363,434 B1 * 3/2002 Eytchison ......... H04L 12/40058
375/E7.019
(Continued)

FOREIGN PATENT DOCUMENTS

| JP | 2006-309642 A | 11/2006 |
|---|---|---|
| JP | 2010-116226 A | 8/2010 |
| JP | 2012-029164 A | 2/2012 |

OTHER PUBLICATIONS

Non-Final Office Action for U.S. Appl. No. 13/691,513, dated Jan. 23, 2015, 31 pages.
(Continued)

*Primary Examiner* — Sm A Rahman
*Assistant Examiner* — Ranjan Pant
(74) *Attorney, Agent, or Firm* — Patent Law Works LLP

(57) ABSTRACT

A system and method for integrating one or more resource servers for one or more types of devices are described using an enterprise service bus and network appliance as a service (NAaaS) application services. The enterprise service bus receives a request for one or more types of media, determines a first communication protocol of the request and one or more types of second communication protocols of the one or more resource servers, translates the request from a first communication protocol into one or more types of second communication protocols for one or more resource servers and retrieves one or more results matching the translated request from the one or more resource servers. A NAaaS application services determine one or more resource servers that the request is for based on the request matching a global index.

20 Claims, 25 Drawing Sheets

(51) Int. Cl.
*G06F 16/41* (2019.01)
*G06F 16/43* (2019.01)
*G06F 1/329* (2019.01)

(52) U.S. Cl.
CPC ............ *H04L 67/025* (2013.01); *H04L 67/16* (2013.01); *H04L 67/18* (2013.01)

(58) Field of Classification Search
CPC ........... H04L 65/1069; H04L 29/06027; H04L 65/403; H04L 67/02; H04L 63/168; G06F 17/3002; G06F 17/30023; G06F 9/465; G06F 9/541; G06F 17/30321; G06F 3/0481; G06F 3/04842; G06F 16/41; G06F 16/43; G06F 16/248; G06F 16/9566; G06F 16/9577; G06F 16/2228; G06Q 10/10; G06Q 10/101; G06Q 10/02; H04N 5/23203
See application file for complete search history.

(56) References Cited

U.S. PATENT DOCUMENTS

| | | | |
|---|---|---|---|
| 6,480,901 B1 | 11/2002 | Weber et al. | |
| 6,636,238 B1* | 10/2003 | Amir ................... | G06F 16/685 |
| | | | 715/730 |
| 7,516,415 B2* | 4/2009 | Shimizu ................. | G11B 27/10 |
| | | | 715/780 |
| 7,984,099 B1 | 7/2011 | Horstmann et al. | |
| 8,135,342 B1 | 3/2012 | Harold | |
| 8,856,355 B2 | 10/2014 | Queen | |
| 9,294,723 B2* | 3/2016 | Seferian ................. | H04N 7/147 |
| 2002/0032677 A1* | 3/2002 | Morgenthaler ......... | G06F 16/70 |
| 2002/0054345 A1 | 5/2002 | Tomida et al. | |
| 2003/0103075 A1 | 6/2003 | Rosselot | |
| 2003/0217186 A1 | 11/2003 | Bushey | |
| 2005/0071519 A1 | 3/2005 | Hart | |
| 2005/0240417 A1 | 10/2005 | Savage | |
| 2006/0045029 A1 | 3/2006 | Ethier et al. | |
| 2007/0268121 A1* | 11/2007 | Vasefi ................... | G06Q 10/06 |
| | | | 340/506 |
| 2008/0195312 A1 | 8/2008 | Aaron et al. | |
| 2008/0303748 A1* | 12/2008 | Borhade ................... | G06F 3/14 |
| | | | 345/2.2 |
| 2010/0121666 A1 | 5/2010 | Niazi | |
| 2010/0169951 A1 | 7/2010 | Vaughan et al. | |
| 2011/0040828 A1* | 2/2011 | Leblanc ............... | G06F 16/9577 |
| | | | 709/203 |
| 2011/0112832 A1* | 5/2011 | Prorock ................. | G11B 27/36 |
| | | | 704/235 |
| 2011/0196972 A1* | 8/2011 | Farmer ............... | H04L 12/1822 |
| | | | 709/228 |
| 2011/0238495 A1* | 9/2011 | Kang ..................... | G06Q 30/02 |
| | | | 705/14.49 |
| 2011/0282968 A1 | 11/2011 | Oliver | |
| 2011/0298596 A1 | 12/2011 | Warrick | |
| 2012/0079080 A1 | 3/2012 | Pishevar | |
| 2012/0270567 A1 | 10/2012 | Johnson | |
| 2012/0293605 A1* | 11/2012 | Seferian ................. | H04N 7/147 |
| | | | 348/14.08 |
| 2013/0117460 A1 | 5/2013 | Hsu et al. | |
| 2013/0332979 A1 | 12/2013 | Baskaran et al. | |
| 2015/0193433 A1* | 7/2015 | Dykeman ............... | G06F 16/43 |
| | | | 707/722 |

OTHER PUBLICATIONS

European Search Report for EP Application 15150498.2, dated May 15, 2015, 5 pages.
European Official Communication for EP Application No. 13 194 520.6 dated Jul. 19, 2016; 7 pages.
Notice of Allowance for U.S. Appl. No. 13/689,752, dated Feb. 4, 2016, 9 pages.
Notice of Allowance for U.S. Appl. No. 13/691,513, dated Mar. 22, 2016, 10 pages.
Non-Final Office Action for U.S. Appl. No. 14/614,184, dated May 2, 2017, 14 pages.
Japanese Office Action for JP Application 2013-244940, dated Oct. 12, 2017, 9 pages.
Notice of Allowance for U.S. Appl. No. 14/614,184, dated Dec. 15, 2017 (10 pages).

* cited by examiner

UNIFIED SERVER FOR MANAGING A HETEROGENEOUS MIX OF DEVICES

CROSS REFERENCE TO RELATED APPLICATIONS

This application is a continuation of and claims priority to U.S. application Ser. No. 13/689,752, filed Nov. 29, 2012, titled "Network Appliance Architecture for Unified Communication Services," which is incorporated by reference in its entirety.

BACKGROUND

1. Field of the Invention

The techniques disclosed herein relate to a system and method for integrating one or more resource servers for one or more types of devices. In particular, the techniques relate to a unified server for managing a heterogeneous mix of devices.

2. Description of the Background Art

Consumers have a variety of consumer electronic devices to choose from. A problem arises, however, because many of these devices have different user interfaces and users find it confusing and difficult to adjust. For example, devices can have different usage paradigms, ranging from credentials for individual logins to group logins and different portals to access device usage sessions, documents, or content in general. In addition, each device has a different application programming interface (API) for both the device itself and its backend resulting in a need to learn different APIs and API styles for each device to be able to employ them in different solutions.

It is also difficult to update the devices' backends because each device has a different backend or server that the customer has to install and manage if hosted privately, or interface with if used publicly. Since each device has a different backend, the user has to update each device backend separately. Furthermore, the data about each device resides in a separate system resulting in device data fragmentation and eliminating the opportunity to correlate device data.

SUMMARY

The techniques disclosed herein overcome the deficiencies of the prior art with a system for integrating one or more resource servers for one or more types of devices. In one embodiment, the system includes an enterprise service bus and network appliance as a service (NAaaS) application services. The enterprise service bus receives a query from a first device for one or more types of media related to the query, to transmit the request to NAaaS application services, to receive the determination of one or more resource servers that are associated with keywords, to generate a request for media for the one or more resource servers, to determine a first communication protocol of the request and one or more types of second communication protocols of the one or more resource servers, to translate the request from the first communication protocol into each one of the one or more types of second communication protocols, to determine a first message format of the request and one or more types of second message formats of the one or more resource servers, to transform the request from the first message format into each one of the one or more types of second message formats, to retrieve the one or more types of media matching the translated request from the one or more resource servers and to send the one or more types of media to the first device. The NAaaS application services are configured to receive the query from the enterprise service bus, to identify the keywords in a global database index that match the query, to determine the one or more resource servers that store media associated with the keywords and to send the determination of the one or more resource servers to the enterprise service bus.

Other aspects include corresponding methods, systems, apparatuses, and computer program products for these and other innovative aspects.

The system advantageously creates a facility for federated search for accessing information from all the resource servers for one or more types of devices in a network. The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1A:
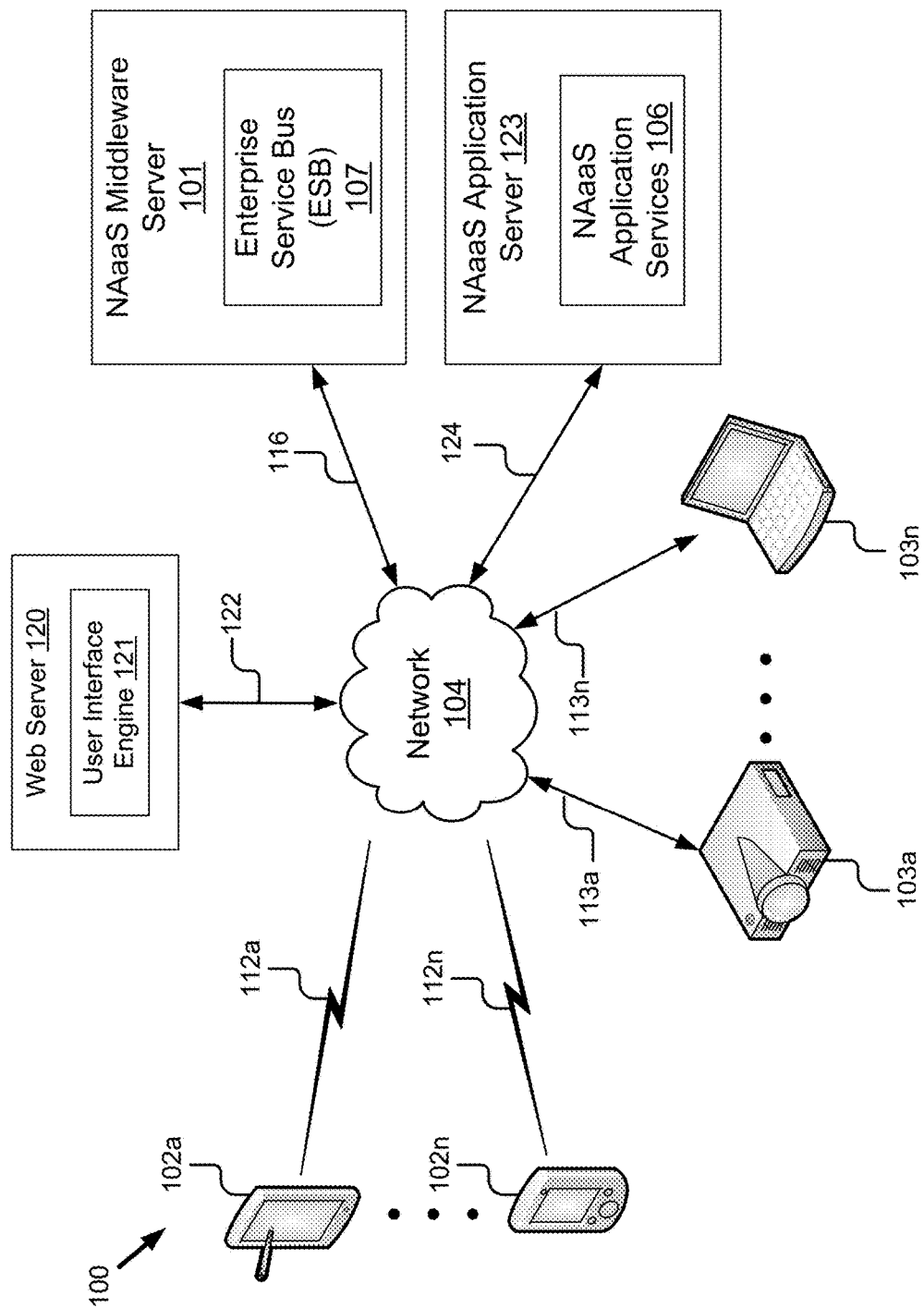
FIG. 1A is a high-level block diagram illustrating one embodiment of a system for integrating one or more resource servers for one or more types of devices.

A system and method for integrating one or more resource servers for one or more types of devices is disclosed. In the following description, for purposes of explanation, numerous specific details are set forth in order to provide a thorough understanding of the techniques disclosed herein. It will be apparent, however, to one skilled in the art that the techniques can be practiced without these specific details. In other instances, structures and devices are shown in block diagram form in order to avoid obscuring the techniques. For example, the techniques are described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the techniques introduced herein is also described. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1A illustrates a high-level block diagram of a system 100 for implementing a service oriented architecture that supports complex event processing and business activity monitoring are described below. The illustrated embodiment of the system 100 comprises: user devices 102a-102n, collaborative computing devices 103a-103n, a network 104, a web server 120, a Network Appliance As A Service (NAaaS) middleware server 101 and a NAaaS application server 123. In FIG. 1A and the remaining figures, a letter after a reference number, for example, "102a" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the plurality of user devices 102a-102n, the plurality of collaborative computing devices 103a-103n, the web server 120, the NAaaS application server 123 and the NAaaS middleware server 101, in practice any number of networks 104 can be connected to the entities.

The user devices 102a-102n are devices associated with a particular user. For example, a company provides its employees with a mobile device or a laptop. The user devices 102a-102n are each coupled to the network 104 via signal lines 112a-112n respectively. The user device 102 is any computing device including a memory, a processor and a communication capability. For example, the user device 102 can be a tablet computer, a personal digital assistant, a smart phone, a feature phone, etc. The user devices 102 can communicate with the network 104 wirelessly or through wired connectivity. The user devices 102 include one or more user applications (not shown) that generate messages to be processed by the enterprise service bus 107.

The user device 102 is adapted for sending and receiving data to and from the NAaaS middleware server 101. For example, the user device 102 sends a command to project an image of a presentation program document on at least one of the plurality of collaborative computing devices 103a-103n to the NAaaS middleware server 101. The user device 102 includes a display for viewing information provided by the enterprise service bus 107. For example, the user device 102 receives graphical data from the NAaaS middleware server 101 for listing the plurality of collaborative computing devices 103a-103n for display on the user device 102.

The user device 102 determines its location so that the user device 102 can interact with other user devices 102 or collaborative computing devices 103 via the NAaaS middleware 101. The user device 102 determines its location information by using global positioning system (GPS) circuitry included within the device itself to determine its location. For determining the user device's 102 location indoors, the user device 102 employs radio frequency, ultra-sound signal or invisible light communication. For example, the user device 102 determines its location through wireless access points based on measuring the intensity of received signals. The user device 102 accesses a database including pairs of media access control (MAC) addresses and locations over the Internet. To determine a location, the user device 102 retrieves the location corresponding to the access point MAC address from the database.

In another embodiment, the user device 102 performs a device discovery process that works via the network 104 using specific protocols like SNMP, ICMP, Bonjour, etc. For example, the user device 102 queries the NAaaS middleware server 101 to discover devices. The NAaaS middleware server 101 uses SNMP or ICMP protocols to discover devices and reports back to the user device 102 with the found devices together with their internet protocol (IP) address, media access control (MAC) addresses, etc.

The collaborative computing devices 103a-103n are devices associated with a particular location and/or a particular function. Collaborative computing devices 103a-103n can be assigned to a conference room or are assigned for meetings. For example, a projector and an interactive whiteboard can be assigned to a select conference room from a plurality of conference rooms inside a building. The collaborative computing devices 103a-103n are each coupled to the network 104 via signal lines 113a-113n respectively. The collaborative computing device 103 is any computing device including a memory and a processor. For example, the collaborative computing device 103 can be a projector, a monitor, a television, an interactive whiteboard, a webcam, a microphone, a loudspeaker, a CD/DVD player, an electronic paper device, an electronic reader, a desktop computer, a tablet, a smartphone, etc.

The collaborative computing device 103 is adapted for sending and receiving data to and from the NAaaS middleware server 101. For example, a projector in a conference room can receive a presentation program document from the NAaaS middleware server 101. In another example, a video conferencing device including a webcam, a microphone and a monitor in a first location can capture a real-time audio-video synchronous communication data stream and send it to another video conferencing device in a second location through the enterprise service bus 107 in the NAaaS middleware server 101.

The NAaaS middleware server 101 is any computing device including a memory and a processor which is connected to the network 104 via signal line 116. The NAaaS middleware server 101 comprises an enterprise service bus 107. The enterprise service bus is described in further detail below with reference to FIG. 2A.

The enterprise service bus 107 includes software and routines for providing a standard interface to one or more networks of disparate devices and their corresponding resource servers that are deployed independently to communicate with each other. In one embodiment, the enterprise service bus 107 executes one or more services including invocation support, routing (e.g., content based routing, static/deterministic routing, policy based routing, rules based routing) mediation, message queue (e.g., publish-subscribe), process choreography, service orchestration, complex event processing, security and management (e.g., monitoring, logging). The enterprise service bus 107 also calls methods contained in the code on the NAaaS application services 106 that implement the services. For example, the enterprise service bus 107 instructs the NAaaS application services to authenticate users, log device usage entries, store media, analyze media, index keywords related to users' skills and search a database for user profiles that include skills that match a user query.

The user devices 102a-102n or the collaborative computing devices 103a-103n use a particular messaging format over a particular communication protocol to communicate with and send service requests to each other through the enterprise service bus 107. A message format defines the structure and form of the message. For example, message formats include Simple Object Access Protocol (SOAP), eXtensible Markup Language (XML), etc. A communication protocol defines a set of rules governing the syntax, semantics, and synchronization of communications. For example, communication protocols include File Transfer Protocol (FTP), Hypertext Transfer Protocol (HTTP), Message Queue (MQ), Internet Inter-Orb Protocol (IIOP), etc. While the enterprise service bus 107 and the NAaaS application services 106 are illustrated as being on separate servers, in one embodiment they are on the same server.

The NAaaS application server 123 is any computing device including a memory and a processor which is connected to the network 104 via signal line 124. The NAaaS application server 123 includes NAaaS application services 106, which is a collection of implementation services that are abstracted as an application and composed by the enterprise service bus 107 in order to deliver higher level services. The NAaaS application services 106 are described in further detail below with reference to FIG. 2B.

The web server 120 is any computing device including a memory and a processor that is connected to the network 104 via signal line 122. The web server 120 comprises a user interface engine 121. While the web server 120 is illustrated in Figure 1A as being a separate server, in some embodiments the user interface engine 121 could be stored on a user device 102 or function as a standalone application.

The user interface engine 121 is software and routines for generating graphical data for displaying a user interface. In one embodiment, the user interface engine 121 is a set of instructions executable by the processor to provide the functionality described below for generating graphical data for displaying a user interface. In another embodiment, the user interface engine 121 is stored in the memory and is accessible and executable by the processor.

The user interface engine 121 receives a request for generating graphical data for displaying information for controlling collaborative computing devices 103. For example, the user interface engine 121 generates graphical data for displaying a webpage that lists the available collaborative computing devices 103 in a particular location or functions associated with each collaborative computing device 103. The user inputs information and the user interface engine 121 transmits the information to the enterprise service bus 107, which determines the action to be performed. For example, if the user device 102 transmits an instruction for a projector to project an image contained in the request, the user interface engine 121 transmits the request to the enterprise service bus 107, which transmits the request to the projector and instructs the NAaaS application services 106 to perform other actions on the request. FIGS. 3-14 includes example user interfaces.

In another embodiment, the user interface engine 121 receives a request for generating graphical data for displaying a search user interface. For example, the user interface engine 121 generates graphical data for displaying a webpage with a text box for inputting a query of one or more terms. The user inputs the query and the user interface engine 121 transmits the query to the enterprise service bus 107, which transmits the request to the NAaaS application services 106. The search user interface may include an input for entering a search query by a requestor. The search query may include text information, visual information or audio information.

The NAaaS application services 106 retrieve matching search results from one or more resource servers and send the search results to the enterprise service bus 107, which transmits the search results to the user device 102. In one embodiment, the user interface engine 121 transmits one or more of the profile and one or more types of media to the requestor via the enterprise service bus 107. An example of the search user interfaces are described below in more detail with reference to FIGS. 9-10.

Figure 1B:
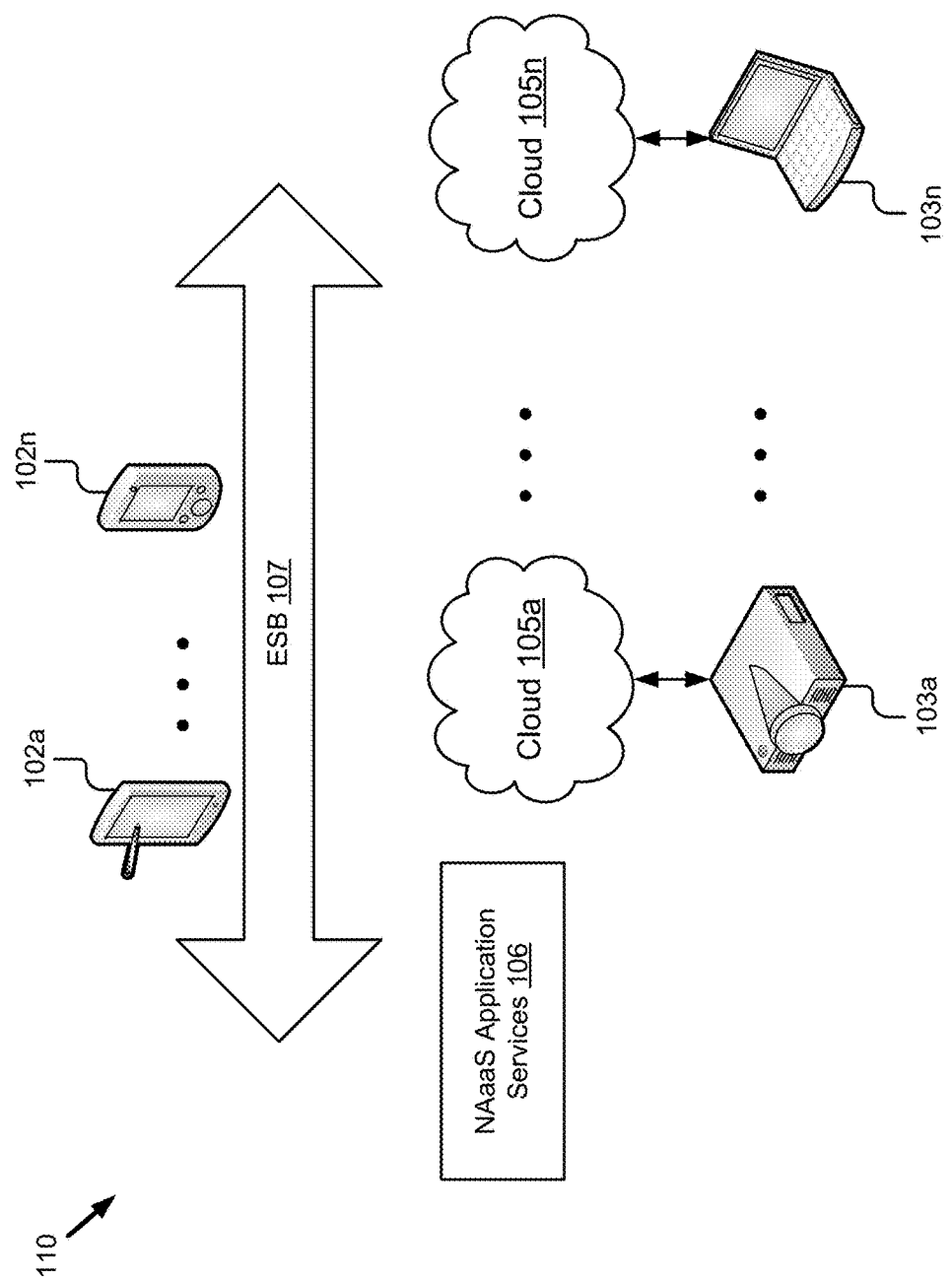
FIG. 1B is a high-level block diagram illustrating another embodiment of a system for integrating one or more resource servers for one or more types of devices.

FIG. 1B illustrates another high-level block diagram of a system 110 for implementing a service oriented architecture that supports complex event processing and business activity monitoring are described below. The illustrated embodiment of the system 110 comprises: user devices 102a-102n as a first layer, the enterprise service bus 107 as a second layer and the NAaaS application services 106, the collaborative computing devices 103a-103n and their corresponding resource servers 105a-105n as a third layer. Each one of the resource servers 105a-105n store a copy of the media type and index the media type associated with the corresponding collaborative computing devices 103a-103n whenever the collaborative computing devices 103a-103n execute a transaction in response to a request. For example, a projector resource server stores a projected presentation program document, a video conferencing resource server stores a video recording of the video conference and an interactive whiteboard resource server stores an image of the interactive whiteboard.

The enterprise service bus 107 layer processes requests coming in from the user devices 102a-102n layer and relays the requests to the NAaaS application services 106 for processing and the collaborative computing devices 103a-103n and their corresponding resource servers 105a-105n. In one embodiment, the enterprise service bus 107 layer comprises one or more ports that provide an interface for user applications on the user devices 102a-102n to connect with the enterprise service layer 107 to send messages and receive responses. In another embodiment, the enterprise service bus 107 layer comprises one or more ports to communicate with the NAaaS application services 106 layer and the layer with the collaborative computing devices 103 and their corresponding resource servers 105a-105n. In one embodiment, a port on the enterprise service bus 107 may be of a particular port type that handles only messages and communications of a particular message format and communication protocol of a user application. In another embodiment, a port on the enterprise service bus 107 may be of a universal port type that includes a generic interface to the enterprise service bus 107 and can handle any messaging format and communication protocol combination.

Enterprise Service Bus

Figure 2A:
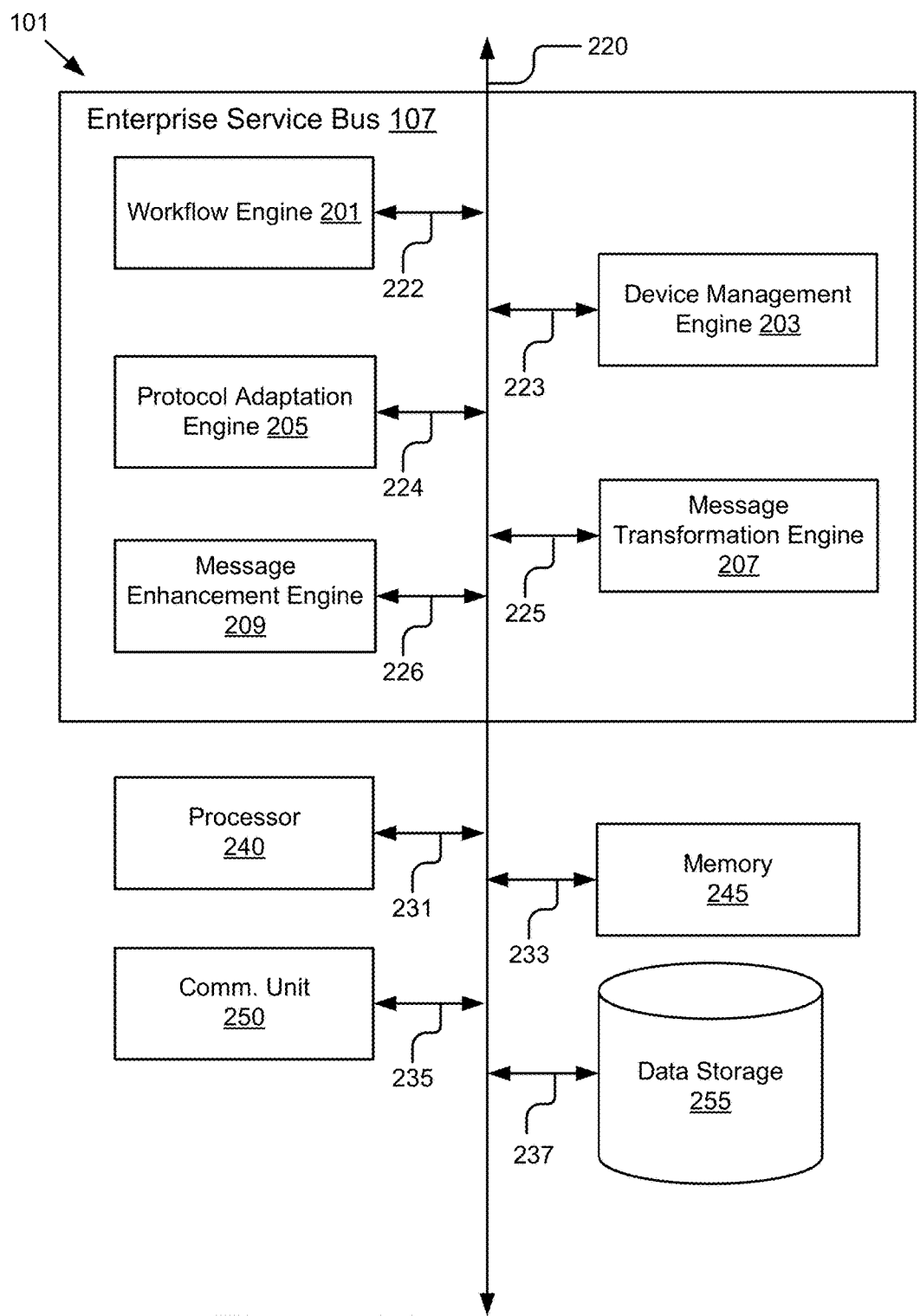
FIG. 2A is a block diagram illustrating one embodiment of an enterprise service bus.

Referring now to FIG. 2A, an example of the enterprise service bus 107 is shown in more detail. FIG. 2A is a block diagram of a server 101 that includes: a processor 240, a memory 245, a communication unit 250 and the enterprise service bus 107.

The processor 240, the memory 245, the communication unit 250 and the enterprise service bus 107 are communicatively coupled to the bus 220. The bus 220 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 220 for communication with the other components of the server 101 via signal line 231. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 220 for communication with the other components of the NAaaS middleware server 101 via signal line 233. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 250 is hardware for receiving and transmitting data by linking the processor 240 to the network 104 and other processing systems. The communication unit 250 receives data such as images, videos or documents from a plurality of user devices 102a-102n. The communication unit 250 receives requests for media associated with a particular subject from the web server 120. The communication unit 250 also receives requests for one or more types of media from the web server 120. The communication unit 250 transmits information to the plurality of collaborative computing devices 103a-103n. For example, the communication unit 250 transmits graphical data for displaying images, documents or videos. The communication unit 250 is coupled to the bus 220 for communication with the other components of the NAaaS middleware server 101 via signal line 235.

In one embodiment, the communication unit 250 includes a port for direct physical connection to the user devices 102, the collaborative computing devices 103, the resource servers 105, the NAaaS application server 123, the web server 120 or to another communication channel. For example, the communication unit 250 includes an RJ14 or similar port for wired communication with the ESB 107. In another embodiment, the communication unit 250 includes a wireless transceiver for exchanging data with the user devices 102 or any other communication channel using one or more wireless communication methods, such as IEEE 802.11, IEEE 802.16, Bluetooth® or another suitable wireless communication method.

In yet another embodiment, the communication unit 250 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 250 includes a wired port and a wireless transceiver. The communication unit 250 also provides other conventional connections to the network for distribution of files and/or media objects using standard network protocols such as TCP/IP, FTP, HTTP, HTTPS and SMTP as will be understood to those skilled in the art.

The data storage 255 is a non-transitory memory that stores data for the functionality of the NAaaS middleware server 101. The data storage 255 is coupled to the bus 220 for communication with other components of the server 101 via signal line 237.

In one embodiment, the data storage 255 stores a library of communication protocols and messaging formats for protocol conversion. The communication protocols and messaging formats that the data storage 255 stores include, for example, Simple Object Access Protocol (SOAP), eXtensible Markup Language (XML), Java Message Service (JMS), File Transfer Protocol (FTP), Hypertext Transfer Protocol (HTTP), Message Queue (MQ), Internet Inter-Orb Protocol (HOP), Representational State Transfer (REST), JavaScript Object Notation (JSON), Distributed Component Object Model (DCOM), Simple Network Management Protocol (SNMP), etc. In some embodiments, the protocol adaptation engine 205 accesses the protocols and messaging formats to convert requests into a protocol and messaging format that is compatible with the recipient.

The enterprise service bus 107 includes: a workflow engine 201, a device management engine 203, a protocol adaptation engine 205, a message transformation engine 207 and a message enhancement engine 209. These components of the enterprise service bus 107 are communicatively coupled to each other via the bus 220.

The workflow engine 201 is software and routines for performing basic enterprise service bus functionalities and for handling communications between the components of the NAaaS middleware server 101 and other components of the system 100. In one embodiment, the workflow engine 201 is a set of instructions executable by the processor 240 to provide the functionality described below for receiving a request, routing the request, performing several steps and interacting with the NAaaS application services 106 and the collaborative computing devices 103 and their corresponding resource servers 105a-105n to satisfy the request. In either embodiment, the workflow engine 201 is adapted for cooperation and communication with the processor 240, the communication unit 250 and other components of the NAaaS middleware server 101 via the signal line 222.

The workflow engine 201 receives a request, processes the request and communicates with the NAaaS application services 106 and the collaborative computing devices 103 and their corresponding resource servers 105a-105n to complete the request. For example, the workflow engine 201 receives a request from a user device 102 for one of the collaborative computing devices 103 to project an image. The workflow engine 201 authenticates the user associated with the user device 102 by interacting with the user management service 210 that is part of the NAaaS application services 106, instructing the device usage analytics service 212 to log the command, a user identifier for the user associated with the user device 102, the date and time of the request and the IP address of the user device 102, copying the image that the user sent to the repository by interacting with the media repository services 206, performing optical character recognition of the image and indexing keywords in the image by interacting with the media analysis service 208 and transmits the image to the collaborative computing device 103 for projection.

The workflow engine 201 receives information via the communication unit 250 and transmits the information to the appropriate component of the enterprise service bus 107 or components of the system 100. In one embodiment, the workflow engine 201 receives a request to transmit media to a collaborative computing device 103. The workflow engine 201 can receive one or more types of media. The workflow engine 201 routes or transmits the media to the collaborative computing device 103. For example, the workflow engine 201 receives an image from a user device 102 (e.g., a smart phone) for display by a collaborative computing device 103 (e.g., a projector or a monitor).

In another embodiment, the workflow engine 201 receives a request from a web server 120 for a list of media in a particular area or subject. The workflow engine 201 transmits the request to the NAaaS application services 106 to perform a search of the data storage 268 based on search terms included in the request. Once the NAaaS application services 106 return matching results, the workflow engine 201 transmits the results to a requestor at the user device 102 that submitted the request to the web server 120. In one embodiment, responsive to determining the context of the request, the workflow engine 201 determines one or more resource servers 105 that the request is directed toward based on the request matching a global index. The workflow engine 201 accesses the global index stored in the data storage 268.

The requestor may provide the search query for one or more types of media associated with a subject. For example, the requestor may request to find media associated with Linux. The search query may include text. For example, the requestor provides the word "Linux" in a text input box of a search user interface generated by the user interface engine 121 on the web server 120. The search query may include visual information. For example, the requestor may provide an image or video of Tux, the mascot of Linux. The search query may include audio of a voice. For example, the requestor may provide audio of a voice saying the word "Linux." The workflow engine 201 transmits the search query to the NAaaS application services 106 for processing.

In another embodiment, the workflow engine 201 receives requests and sends the requests to the protocol adaptation engine 205 and instructs the protocol adaptation engine 205 to send the requests to the search engine 221, which is one of the NAaaS application services 106. In one embodiment, the workflow engine 201 receives a request from an Application Programming Interface (API) associated with a first device in a first communication protocol for translation. In one embodiment, the requests are buffered in the message queue of the enterprise service bus 107 and the workflow engine 201 polls the message queue periodically to process the requests in queue. The workflow engine 201 determines the context of the request. For example, an HTTP request with a first line such as "category": "SEARCH" provides a context to the workflow engine 201 that the request is for searching one or more resource servers, a second line such as "service": "video" provides a context to the workflow engine 201 that the request is for the one or more resource servers associated with storing video recordings, a third line such as "type": "video device X" provides further context to the workflow engine 201 that the one or more resource servers are associated with a device of "video device X" type, a fourth line such as "arguments": {"userid": "u_0613902", "URL": "10.154.25.9", "date": "11/21/2012", "filename": "iOS"} further narrows the context for the workflow engine 201. In situations where the protocol needs to be translated to communicate with the resource servers 105, the workflow engine instructs the protocol adaptation engine 205 to translate the request appropriately.

The device management engine 203 is code and routines for determining a location of the one or more types of devices, functionality associated with the one or more types of devices and a status of the one or more types of devices. In one embodiment, the device management engine 203 is a set of instructions executable by the processor 240 to provide the functionality described below for determining location, functionality and status associated with the one or more types of devices. In another embodiment, the device management engine 203 is stored in the memory 245 and is accessible and executable by the processor 240. In either embodiment, the device management engine 203 is adapted for cooperation and communication with the processor 240, the communication unit 250, the controller 202 and other components of the NAaaS middleware server 101 via signal line 223.

In one embodiment, the device management engine 203 communicates with the NAaaS application services 106 to determine the location of the one or more types of devices. For example, the device management engine 203 receives a query from the user device 102 to discover the location of the user device 102 and discover the collaborative computing devices 105. The device management engine 203 interacts with the location service 299 that is part of the NAaaS application services 106 to match the location of the user device 102 with a known location. In another embodiment, the device management engine 203 transmits the location of the collaborative computing device 103 to the user device 102.

In one embodiment, the device management engine 203 performs a device discovery process that works via the network 104 using specific protocols like SNMP, ICMP, Bonjour, etc. For example, the device management engine 203 uses SNMP or ICMP protocols to discover devices together with their internet protocol (IP) address, media access control (MAC) addresses, etc. In another embodiment, the device management engine 203 determines location information of a device by using global positioning system (GPS) circuitry included within the device itself. In another embodiment, the device management engine 203 determines the device location indoors as the device employs radio frequency, ultra-sound signal or invisible light communication. For example, the device determines its location through wireless access points based on measuring the intensity of received signals. The device management engine 203 accesses a database including pairs of media access control (MAC) addresses and locations over the Internet. To determine a location, the device management engine 203 retrieves the location corresponding to the access point MAC address from the database.

In one embodiment, once the device management engine 203 receives the user device 102 location from the location service 299, the device management engine 203 asks a device inventory service 265 that is part of the NAaaS application services 106 to provide a list of devices given a certain location. The device management engine 203 then requests that a device management service 212 that is also part of the NAaaS application services 106 filter the list of devices based on the availability of the devices.

In one embodiment, the request from the user device 102 specifies a location associated with the collaborative computing devices 105. For example, a user wants to know about devices in a first conference room in Tokyo, Japan because the user is scheduled to give a presentation from a second conference room in California, USA to people who will be in the first conference room. In another example, a user creates a calendar event at a location and wants to know the list of available devices at the location of the event. In one embodiment, the location service 299 matches the location associated with a request to a known location from the data storage 268 of NAaaS application services 106. A location identifier is sent to the device management engine 203 by the location service 299. In another embodiment, the device inventory service 265 provides a list of all devices on the network 104 to the device management engine 203 responsive to the device management engine 203 using the location identifier of the user device 102 for querying the device inventory service 265. In yet another embodiment, the device management engine 203 queries the device management service 212 to limit the list of available devices to a particular area and the device management service 212 transmits the information back to the device management engine 203. For example, a location of an available projector from a list of collaborative computing device 105 can be identified to be in a first conference room inside a building in Tokyo, Japan.

In one embodiment, the device management engine 203 determines a list of functions associated with each of the plurality of devices. For example, the list of functions include power on, power off, projection, zoom, enhance, automatic focus, print, two-way video recording and transmission, two-way audio recording and transmission, language translation, text to speech translation and speech to text translation, etc.

In one embodiment, the device management engine 203 determines a current status of one or more devices. For example, a status of a projector in a conference room can be determined to be in use, out of service, idle, off, etc. In another embodiment, the device management engine 203 determines that one or more devices reserved by a user are idle for a set amount of time. In one embodiment, the device management engine 203 interacts with the device management service 212 that is part of the NAaaS application services 106 to update the status of a device.

In one embodiment, the device management engine 203 receives an access control list for a calendar event from the workflow engine 201 and determines the one or more user devices 102 associated with the people participating in the calendar event. The device management engine 203 determines the one or more user devices 102 by querying the device inventory service 265 using the access control list. For example, the device management engine 203 uses the user identifiers in the access control list and queries the device inventory service 265 for a list of devices associated with the users participating in the calendar event. The device inventory service 265 provides the device management engine 203 with a list of device identifiers for the one or more user devices 102 associated with the users participating in the calendar event.

In one embodiment, the device management engine 203 determines the location of one or more user devices 102 and consequently the location of the users carrying the user devices 102 prior to the start of the calendar event. For example, the device management engine 203 determines the location of user devices five minutes prior to the start of the calendar event. In another embodiment, the device management engine 203 determines the location of the one or more users within a threshold distance from the venue of the calendar event. For example, a first user might be in an adjacent building near the venue and a second user might be negotiating road traffic five miles from the venue where the calendar event is scheduled. The device management engine 203 interacts with the device inventory service 265 and the location service 299 in the NAaaS application services 106 to store the determined location information.

In one embodiment, when all the users in the access control list are determined to be present at the venue, the device management engine 203 interacts with the notification service 269 to generate a notification that suggest to start the calendar event. In another embodiment, when at least one user in the access control list is absent from the venue, the device management engine 203 interacts with the notification service 269 to generate a notification to delay the start of the event.

The protocol adaptation engine 205 is software and routines for adapting and translating protocols. In one embodiment, the protocol adaptation engine 205 is a set of instructions executable by the processor 240 to provide the functionality described below for adapting and translating protocols. In either embodiment, the protocol adaptation engine 205 is adapted for cooperation and communication with the processor 240, the communication unit 250 and other components of the NAaaS middleware server 101 via the signal line 224.

In one embodiment, the protocol adaptation engine 205 receives a request from the workflow engine 201 in a first communication protocol and performs adaptation and translation to make the communication protocol compatible with the recipient of the request. For example, the protocol adaptation engine 205 receives an HTTP request from the user device 102 to "turn off" a projector. The projector communicates using TCP. The protocol adaptation engine 205 adapts an HTTP request to be forwarded to a TCP endpoint and transforms the "turn off" HTTP request to its counterpart TCP command.

In one embodiment, the protocol adaptation engine 205 identifies one or more types of second communication protocols associated with the one or more resource servers. For example, the protocol adaptation engine 205 identifies that a first resource server 105a associated with a projector device uses a Transmission Control Protocol (TCP) as a communication protocol, a second resource server 105b associated with an interactive whiteboard uses a Simple Network Management Protocol (SNMP) as a communication protocol and so on. In another embodiment, the protocol adaptation engine 205 stores the one or more protocols in the data storage 255 for each of the one or more resource servers 105a-105n.

In one embodiment, the protocol adaptation engine 205 translates the request from the first communication protocol into each one of the one or more types of second communication protocols associated with the one or more collaborative computing devices 103a-103n and resource servers 105a-105n, respectively. For example, the protocol adaptation engine 205 translates request from an HTTP protocol to a TCP protocol that the first resource server 105a associated with the projector device can understand, translates the HTTP protocol into an SNMP protocol that the second resource server 105b associated with the interactive whiteboard can understand and so on. In yet another embodiment, the workflow engine 201 receives the request which is passed to the protocol adaptation engine 205 which sends the translated request to the message queue in the enterprise service bus 107 from where the translated requests are routed to the appropriate resource servers 105 and their APIs.

The message transformation engine 207 is software and routines for transforming message formats. In one embodiment, the message transformation engine 207 is a set of instructions executable by the processor 240 to provide the functionality described below for transforming message formats. In either embodiment, the message transformation engine 207 is adapted for cooperation and communication with the processor 240, the communication unit 250 and other components of the NAaaS middleware server 101 via the signal line 225.

In one embodiment, the message transformation engine 207 transforms message formats in requests from the user device 102 going toward a collaborative computing device 103. For example, the message transformation engine 207 transforms the payload from an eXtensible Markup Language (XML) to JavaScript Object Notation (JSON).

Continuing with the above example, the request includes a JSON message that is passed to the message transformation engine 207 and the message enhancement engine 209:

```
"naaasprotocol": "1.0",
"device":
{
    "category:" "PJS",
    "type": "SOLEIL",
    "url": "10.154.25.9"
}
"ricohuserid_opt": "3"
}
```

Where "naaasprotocol" is the Web API version of the platform, "PJS" designates the projector devices, "SOLEIL" is a type of projector, "url" is the device IP address for the projector and "ricohuserid_opt" is the ID of the user operating the device. In one embodiment, the message transformation engine 207 transforms the JSON message into XML.

In another embodiment, the message transformation engine 207 transforms message formats for querying resource servers 105. For example, the message transformation engine 207 identifies a request with a messaging standard in JavaScript Object Notation (JSON) and translates the JSON to an eXtensible Markup Language (XML) for a first resource server 105a. When the resources are associated with resource servers that use different messaging formats, the message transformation engine 207 translates messages into multiple formats.

The message enhancement engine 209 is software and routines for enhancing messages. In one embodiment, the message enhancement engine 209 is a set of instructions executable by the processor 240 to provide the functionality described below for enhancing messages. In either embodiment, the message enhancement engine 209 is adapted for cooperation and communication with the processor 240, the communication unit 250 and other components of the NAaaS middleware server 101 via the signal line 226.

The message enhancement engine 209 can also enhance the message by adding information not originally present in the request for interacting with a collaborative computing device 103. For example, continuing with the example above, where the user wants to project an image onto a projector that requires additional authentication information, the message enhancement engine 209 retrieves the additional authentication information, such as a password, from the data storage 255 using a user identifier in the request and adds it to the message. Once the message is ready, the message enhancement engine 209 transmits the message to the workflow engine 201 in the enterprise service bus 107, which transmits the message to the collaborative computing device 103 or the NAaaS application services 106 for retrieving media, user profiles, etc. from the resource servers 105.

NAaaS Application Services 106

Figure 2B:
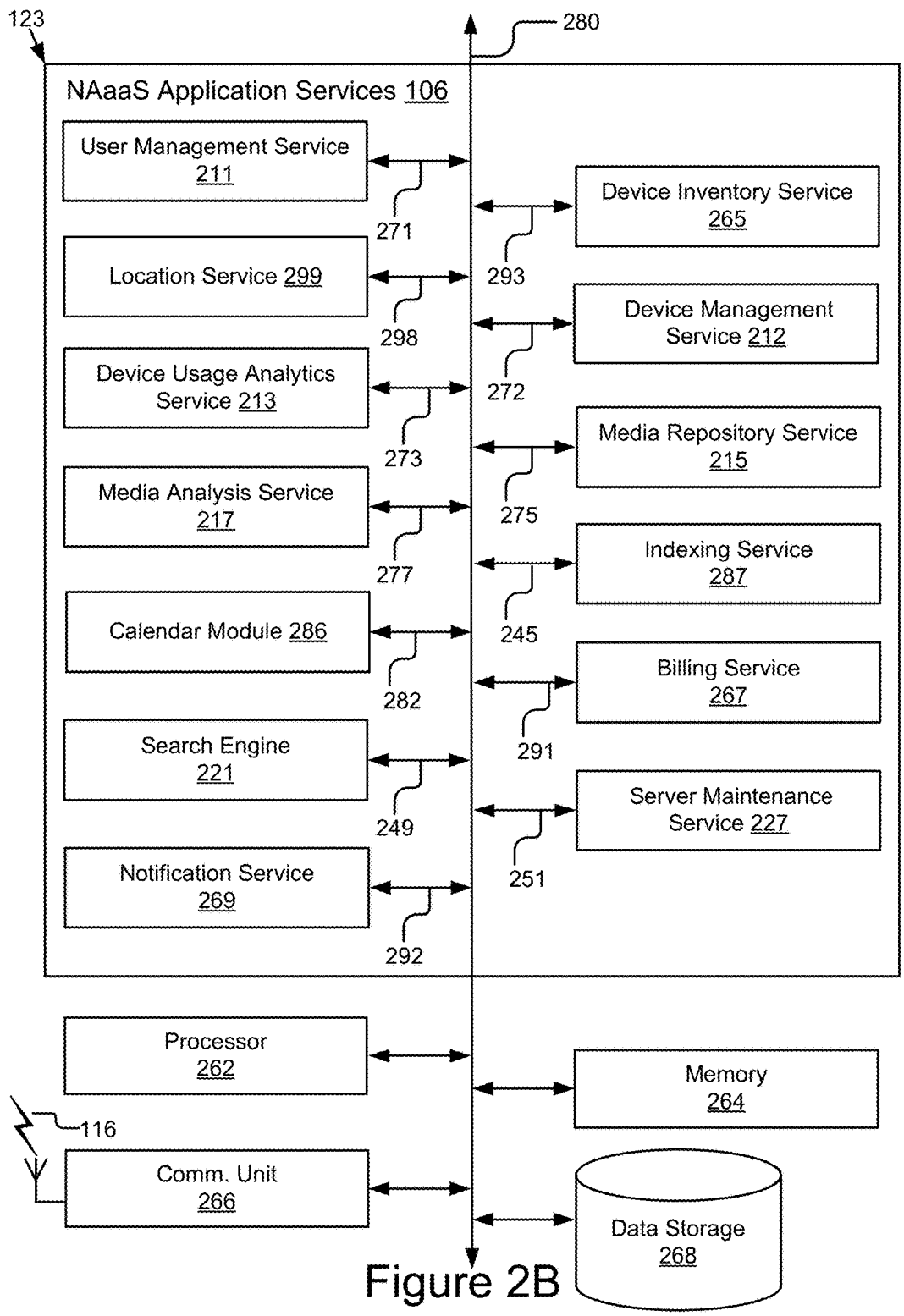
FIG. 2B is a block diagram illustrating one embodiment of Network Appliance as a Service application services.

FIG. 2B illustrates one embodiment of a NAaaS application server 123 that comprises NAaaS application services 106, a processor 262, a memory 264, a communication unit 266 and data storage 268. Some of the components of the NAaaS application server 123 have similar function and form as has been described above with reference to FIG. 2A so like reference numbers and terminology have been used to indicate similar functionality. For example, the communication bus 220, the processor 240, the memory 225 and the communication unit 250 are similar to that described above with reference to FIG. 2A so they will not be described here again.

In one embodiment, the data storage 260 device usage entries, an index of the media, the media and user profiles. The device usage entry describes transactions executed on the collaborative devices 103 and user identifiers associated with the transaction. In some embodiments, the device usage entry includes multiple user identifiers. For example, the device usage entry includes a user identifier for the presenter, e.g. a first user that sends a request from a user device 102 to project an image from a collaborative device 103 and a user identifier for the author of the media The device usage entry includes the type of request (e.g., project, power on, power off, etc.), the type of device involved in the exchange of request and service (e.g., smart phone, projector, etc.), an IP address for the device, a measure of device resource spent (e.g., time, power, etc.), a type of functionality of the device used (e.g., auto-focus, enhance, imaging, etc.), a type of media exchanged (e.g., a presentation program document, a text document, a spreadsheet document, a video recording, an audio recording, an image, etc.), etc.

The data storage 260 stores an index of media. In one embodiment, the index of media includes records for each media including metadata for each media. For example, the metadata may include pointer data for accessing the original media (e.g. a full presentation instead of merely an image of a slide of the presentation) from the cloud, an author of the media, etc. In one embodiment, the metadata also includes results from the media analysis service 217, such as a text version of the image. In one embodiment, the data storage 260 also stores a copy of the media included in the requests. For example, the data storage 260 receives a copy of the media from the media repository services 214.

The data storage 260 stores user profiles. In one embodiment, the user profiles include records for each user. The records for each user may include a graphical representation of the user (e.g. a photo of the user), name, a title, keywords related to the user, media associated with the user (e.g., media authored by the user or media presented by the user), presentations associated with the user, etc. In one embodiment, the keywords related to the user include a list of keywords. The NAaaS application services 106 is a collection of individual lower-level services with individual application programming interfaces (APIs) that are composed by the enterprise service bus 107 to deliver higher services. For example, a "project" command sent by a user device 107 to the enterprise service bus 107 will invoke a module in the NAaaS application services 106 that will authenticate the user device, identify text in the media and save the document in the data storage 260. The services do not communicate with each other. Instead the services receive instructions from the enterprise service bus 107, complete the requested task, save data in the data storage 260 if applicable and return information to the enterprise service bus 107.

The NAaaS application services 106 is a collection of individual lower-level services with individual application programming interfaces (APIs) that are composed by the enterprise service bus 107 to deliver higher services. For example, a "project" command sent by a user device 102 to the enterprise service bus 107 will invoke a module in the NAaaS application services 106 that will authenticate the user device 102, identify text in the media, create a database index and save the document along with the database index in the data storage 268. The services do not communicate with each other. Instead the services receive instructions from the enterprise service bus 107, complete the requested task, save data in the data storage 268 if applicable and return information to the enterprise service bus 107.

In one embodiment the services include a user management service 211, a device inventory service 265, a location service 299, a device management service 212, a device usage analytics service 213, a media repository service 215, a media analysis service 217, an indexing service 287, a calendar module 286, a billing service 267, a search engine 221, a server maintenance service 227 and a notification service 269. Persons of ordinary skill in the art will recognize that the enterprise service bus 107 can compose additional services to complete requests.

The user management service 211 is software and routines for registering users in the network 104 and performing authentication of users. In one embodiment, the user management service 211 is a set of instructions executable by the processor 262 to provide the functionality described below for registering users. In another embodiment, the user management service 211 is stored in the memory 264 and is accessible and executable by the processor 262. In either embodiment, the user management service 211 is adapted for cooperation and communication with the processor 262 and the communication unit 266 via signal line 271.

The user management service 211 receives user information and generates a user profile. For example, the user management service 211 receives a name, a job title, a job code, an e-mail address, a phone number, a username, a password, a retina scan of the user, a fingerprint swipe of the user, etc. The user management service 211 generates login credentials for the user based on the registration information and stores the login credentials in the data storage 268 for the user. The user management service 211 associates a unique identifier with the user. This can be the user's full name, an email address for the user, a series of numbers, an employee identifier, etc. The unique identifier is used to track the user's activities in the system.

In one embodiment, the login credentials are generated as a single sign-on with a property that provides access control to multiple and independent devices and services using the same login credentials. For example, a user logs in with the user credentials and gains access to all registered services without being prompted to login at each one of them. In another example, a user logs into different types of devices such as a projector, an interactive whiteboard, etc. using the same user credentials. In one embodiment, the user management service 211 stores the login credentials of users as an organized set of records with a hierarchical structure in a Lightweight Directory Access Protocol (LDAP) server (not shown) associated with a business. The user management service 211 also manages preferences for the user that are received during registration or at other times. For example, the user can upload an image to associate with the login credentials.

In one embodiment where the user devices 102 and/or collaborative computing devices 103 use different login information than the login information used to authenticate the user with the system 100, the user management service 211 receives the login information from the user or an administrator and adds the information to the user's profile. For example, a user's laptop includes a four-digit code that needs to be input before the user can access the contents of the laptop. The user management service 211 adds the information to the user's profile.

The user management service 211 performs authentication. For example, a user enters login credentials into a user interface on the user device 102. The user device 102 transmits the login credentials to the enterprise service bus 107, which requests that the user management service 211 authenticate the user based on the login credentials. The user management service 211 identifies the user associated with the user device 102, compares the login credentials to the user profile and either sends a confirmation back to the enterprise service bus 107 that the login credentials were correct or a notification that there was a login error. The confirmation includes the user identification associated with the user.

In one embodiment, if the login request for authentication does not include a correct user name and password, the login request is denied. In another embodiment, the user management service 211 is used in account recovery when the user has forgotten his, or her, username and/or password. In some instances, the user management service 211 detects a potentially fraudulent authentication by analyzing the secondary information included in the login request. For example, if the username associated with the login request is a username of a user no longer employed at a company, or a suspected bot, the user management service 211 identifies the login request as potentially fraudulent. The user management service 211 detects a potentially fraudulent authentication by comparing the secondary information to historical authentication information of the user. For example, if the login request for authentication originates from a country, or device, that the user has not attempted to send login requests from before (e.g., unregistered device), the user management service 211 identifies the login request as potentially fraudulent. In one embodiment, a potentially fraudulent authentication attempt includes a failed authentication attempt.

The device inventory service 265 is code and routines for registering devices in the network 104. In one embodiment, the device inventory service 265 is a set of instructions executable by the processor 262 to provide the functionality described below for registering devices. In another embodiment, the device inventory service 265 is stored in the memory 264 and is accessible and executable by the processor 262. In either embodiment, the device inventory service 265 is adapted for cooperation and communication with the processor 262 and the communication unit 266 via signal line 293.

The device inventory service 265 receives requests to add, remove and update devices in the network 104 from the workflow engine 201. The device inventory service 265 receives a request to register one or more types of user devices 102a-102n and one or more types of collaborative computing devices 103a-103n. In one embodiment, the device inventory service 265 registers the type of device and an IP address (or MAC address) for the device with the network 104 and creates a device identifier specific for the device. For example, a new projector with model number 1042 is registered and assigned a device identifier, such as, "prj1042u1". In one embodiment, the device inventory service 265 receives a request to register one or more types of user devices 102a-102n under a particular username stored in the data storage 268. For example, a user can register personal devices such as a tablet PC, a smartphone, etc. and associate the devices with a form of identification, such as an employee identifier, user identifier, etc. In one embodiment, the device inventory service 265 maps the location with the device by importing the location identifier provided by the location services 299. In another embodiment, the device inventory service 265 receives a request to register the one or more types of collaborative computing devices 103a-103n for use at a particular location or within certain limits of space. For example, a projector can be registered for use on the first floor of a building and an interactive whiteboard can be registered for use in a conference room. The first floor of the building and the conference room each has a location identifier associated with them. The device inventory service 265 stores the device registration information (e.g., IP addresses, device identifiers, etc.) in the data storage 268.

In another embodiment, the device inventory service 265 identifies devices associated with a location using a location identifier generated by the location service 299 which is explained in further detail below. The location identifier is received from the device management engine 203 in the enterprise service bus 107 for storing in the data storage 268. For example, a projector can be registered to a conference room in a building in Tokyo, Japan and the conference room has a location identifier. A user can access the projector from San Francisco, Calif. using the login credentials indicating the user is a registered user. In yet another embodiment, the device inventory service 265 receives requests to update information associated with the devices that are registered. For example, a user can change the name of a projector, the location of an interactive whiteboard and the firmware version on the video conferencing device, etc.

The location service 299 is code and routines for providing and storing location information of one or more types of devices. In one embodiment, the location service 299 is a set of instructions executable by the processor 262 to provide the functionality described below for storing device location information. In another embodiment, the location service 299 is stored in the memory 264 and is accessible and executable by the processor 262. In either embodiment, the location service 299 is adapted for cooperation and communication with the processor 262 and the communication unit 266 via signal line 298.

In one embodiment, the device management engine 203 from the enterprise service bus 107 interacts with the location service 299 to store location information including name, geographical coordinates, etc. In another embodiment, the location service 299 receives a request to register a location before devices can be registered or assigned to the location. For example, a user may register the location of a new branch in Singapore before another user from Menlo Park, Calif. can send media to the devices that are registered at the Singapore location.

The device management service 212 is code and routines for reserving devices in the network 104 and granting access to the devices. In one embodiment, the device management service 212 is a set of instructions executable by the processor 262 to provide the functionality described below for reserving devices. In another embodiment, the device management service 212 is stored in the memory 264 and is accessible and executable by the processor 262. In either embodiment, the device management service 212 is adapted for cooperation and communication with the processor 262 and the communication unit 266 via signal line 272.

In one embodiment, the device management service 212 receives a request from the device management engine 203 to reserve one or more types of collaborative computing devices 103a-103n that are shared with a group of people, for example, employees in a company. For example, a user employee can reserve a projector, an interactive whiteboard, etc. temporarily under his username or user identifier for use in a calendar event (for e.g., business meeting). In another example, the user employee can supply a device identifier along with the user identifier for reserving devices. The device management service 212 grants an access request for a user of the group to the one or more types of collaborative computing devices 103a-103n that are registered previously using the user's login credentials created by the user management service 211. For example, the user accesses collaborative computing devices 103a-103n such as a projector, a webcam, an interactive whiteboard, etc. using one and the same username and password.

In one embodiment, the device management service 212 grants access to the one or more types of collaborative computing devices 103a-103n reserved for a calendar event. For example, the device management service 212 grants access to a reserved projector in the "conference room 4C" for a calendar event "Staff Meeting" at 10 AM. In another embodiment, the device management service 212 receives a confirmation from a user organizer of the calendar event via the device management engine 203 to power on (or power off) and connect (or disconnect) the collaborative computing devices 103a-103n at a start time (or stop time) as indicated in the calendar event.

The device usage analytics service 213 is software and routines for logging device usage entries associated with the requests in the network 104. In one embodiment, the device usage analytics service 213 is a set of instructions executable by the processor 262 to provide the functionality described below for logging device usage entries. In another embodiment, the device usage analytics service 213 is stored in the memory 264 and is accessible and executable by the processor 262. In either embodiment, the device usage analytics service 213 is adapted for cooperation and communication with the processor 262 and the communication unit 266 via signal line 273.

The device usage analytics service 213 receives a request and a user identifier associated with the request and logs the metadata associated with the request as a device usage entry. If the user associated with request is different from the author of the media, the device usage entry includes a user identifier for both the presenter and the author of the media. For example, a doctor gives a talk about a medical subject to residents at a hospital by using slides that are transmitted from the doctor's user device 102 (e.g. a laptop) to a collaborative computing device 103 (e.g. a projector). Each time the doctor wants to display a slide on the projector, the doctor sends a request to display an image of the slide from the laptop to the projector. The enterprise service bus 107 transmits the request to the user management service 211, which identifies the user associated with the user device 102. The enterprise service bus 107 receives a confirmation of authentication from the user management service 211 and an identity of the user and transmits the request and user identifier to the device usage analytics service 213, which logs a device usage entry. In one embodiment, the device usage entry includes a user identifier for the user associated with the user device 102, an author of the media (if different), a set of actions performed on the collaborative computing device 103, a unique device identifier of the collaborative computing device 103 and a unique identifier (or metadata associated with the media) referring to the stored media in the data storage 268.

The media repository service 215 is code and routines for storing media associated with a request in data storage 268. In one embodiment, the media repository service 215 is a set of instructions executable by the processor 262 to provide the functionality described below for storing media. In another embodiment, the media repository service 215 is stored in the memory 264 and is accessible and executable by the processor 262. In either embodiment, the media repository service 215 is adapted for cooperation and communication with the processor 262 and the communication unit 266 via signal line 275.

In some embodiments, a collaborative computing device 103 is lacking a backend server that stores media. In other embodiments, the data storage 268 includes a copy of media in the request, for example, an image from a PowerPoint presentation. In these instances, the media repository service 215 receives a request from the enterprise service bus 107 that includes media. The media repository service 215 generates a unique identifier associated with the media and stores the media in the data storage 268. In one embodiment, the media repository service 215 receives one or more types of media to associate with a device identifier of a collaborative computing device 103 from the workflow engine 201 and stores the media and the associated device identifier in the data storage 268. In another embodiment, the media repository service 215 receives device identifier along with the user identifier for storing one or more types of media.

The media analysis service 217 is code and routines for analyzing media. In one embodiment, the media analysis service 217 is a set of instructions executable by the processor 262 to provide the functionality described below for analyzing media. In another embodiment, the media analysis service 217 is stored in the memory 264 and is accessible and executable by the processor 262. In either embodiment, the media analysis service 217 is adapted for cooperation and communication with the processor 262 and the communication unit 266 via signal line 277.

The media analysis service 217 receives media associated with a request from the enterprise service bus 107. For example, the media analysis service 217 receives an image that was captured from a slide. The media analysis service 217 applies optical character recognition to the image to identify text associated with the image. The media analysis service 217 stores the text in the data storage 260. In one embodiment, the media analysis service 217 converts content from the image including handwritten, typewritten or printed text to machine-encoded text.

In one embodiment, the media analysis service 217 receives video and/or audio data. The media analysis service 217 may identify a user associated with the video and/or audio data received from a video conferencing device. For example, a video may include the doctor from the example above giving the presentation in front of an interactive whiteboard. The media analysis service 217 may identify the doctor based on performing facial recognition on the video data or performing voice analysis on the audio data. In another embodiment, the media can be provided by audience members that participate in an event. The media analysis service 217 determines an event. For example, the media analysis service 217 determines a presentation. The media analysis service 217 determines audience members at an event. In some embodiments, the media analysis service 217 determines audience member attendance based on location of a user device 102. The media analysis service 217 determines which audience members participated in the event. In one embodiment, the media analysis service 217 determines which audience members participated in an event based on performing facial recognition from video data or performing voice analysis on the audio data.

In one embodiment, the media analysis service 217 receives video data of an event or a presentation from the enterprise service bus 107. For example, the video includes a person in front of an interactive whiteboard for presenting information. The media analysis service 217 may perform optical character recognition on one or more frames of the video. For example, the media analysis service 217 performs optical character recognition on the information presented on the interactive whiteboard. In another embodiment, the media analysis service 217 receives audio data. The media analysis service 217 may identify text from the audio data by using speech-to-text technology.

The indexing service 287 is software and routines for creating one or more database indices for a plurality of resource servers 105a-105n. In one embodiment, the indexing service 287 is a set of instructions executable by the processor 262 to provide the functionality described below for creating the database indices. In another embodiment, the indexing service 287 is stored in the memory 264 and is accessible and executable by the processor 262. In either embodiment, the indexing service 287 is adapted for cooperation and communication with the processor 262 and the communication unit 266 via signal line 245.

In one embodiment, the indexing service 287 determines one or more types of media stored in one or more resource servers 105. The one or more resource servers 105 are associated with one or more types of collaborative computing devices 103. For example, a resource server 105 associated with a collaborative computing device 103 (e.g., a projector) stores slides that are transmitted from the user device 102 (e.g., a laptop) to the collaborative computing device 103. The indexing service 287 identifies metadata associated with the one or more types of media and creates a database index on the database storage 268. The database index holds the metadata and a reference pointer to a location where the one or more types of media related to the metadata are stored. In one embodiment, the indexing service 287 stores the database index in the data storage 268.

The indexing service 287 creates a database index based on a cardinality of metadata. The cardinality refers to the uniqueness of the metadata. The lower the cardinality, the more duplicity present in the metadata. In one embodiment, the indexing service 287 identifies metadata with a high-cardinality (for e.g., user identifier, username, employer identifier, email address, title, specific keywords, etc.) for creating an index. For example, the indexing service 287 identifies a user identifier associated with the user that transmitted the slides to the projector and creates a database index that holds the user identifier and a pointer pointing to a location where the slides related to that user identifier are stored. In another embodiment, the indexing service 287 identifies metadata with a normal-cardinality (e.g., device name, device type, device identifier, internet protocol (IP) address, media type, location, date of event, etc.). For example, the indexing service 287 identifies a device identifier associated with the projector that projected the slides and creates a database index that holds the device identifier and a pointer pointing to a location where the slides related to that device identifier are stored. In yet another embodiment, the indexing service 287 identifies metadata with a low-cardinality (e.g., current employee, former employee, junior employee, senior employee, etc.). For example, the indexing service 287 identifies that the slides were projected by an employee who is a junior employee and creates a database index that holds the expertise level and a pointer pointing to a location where the slides related to that expertise level are stored.

In one embodiment, the workflow engine 201 receives identified text from the media analysis service 217 that analyzed the media for the workflow engine 201. For example, the media analysis service 217 extracts text from video and/or audio data sent by the workflow engine 201. The workflow engine 201 sends the text to the indexing service 287 for identifying keywords in the media, indexing data related to the keywords in the media and creating a global index that includes the keywords and pointers to the media in the resource servers 105. In one embodiment, the indexing service 287 also associates the keywords with user profiles. In one embodiment, the indexing service 287 determines one or more parts of the media. The indexing service 287 determines a title, a table of contents, an overview, a key information section, etc. of one or more slides of a slide show. The indexing service 287 may determine parts of the one or more slides based on location of text, formatting of text, a position of a slide in the slide show, etc. For example, the title of a slide or slide show may appear at the top of a first slide of the slide show appearing in a bold font. The title may include text having a size that is larger relative to other text on the slide or other slides. In another example, a slide having a position at the beginning of the slide show may include an overview of the slide show. In another example, the indexing service 287 determines a key information section based on identifying text having one or more bullet points.

The indexing service 287 determines weights for the keywords. In one embodiment, the indexing service 287 determines weights based on the parts. For example, the indexing service 287 determines a higher weight for a keyword from the title of a slide show than other parts (e.g., text) of the slide show. In another embodiment, the indexing service 287 determines weights based on a count associated with a keyword. For example, the indexing service 287 identifies the number of times each keyword appears in the media.

In one embodiment, the indexing service 287 determines related content. For example, the indexing service 287 determines synonyms for the keywords. In one embodiment, the indexing service 287 performs a search in a thesaurus. In another example, the indexing service 287 determines related content based on a knowledge graph.

The indexing service 287 indexes the keywords and synonyms in the database indices for the plurality of resource servers 105*a*-105*n*. In one embodiment, the indexing service 287 indexes the keywords and synonyms by excluding extraneous words. Extraneous words may include common words (e.g., "a" and "the"). In another embodiment, the indexing service 287 selects a top number of keywords for the index. The indexing service 287 may select a top number of keywords based on the weights for each keyword. In one embodiment, the indexing service 287 stores an index of keywords and synonyms in the data storage 268. For example, the indexing service 287 stores the database index in one or more tables of a database in data storage 268. In one embodiment, the index of keywords includes data describing an association between a keyword and the media. For example, the index includes records with a keyword and pointer data (e.g., uniform resource locator or document/file identifier) associated with the media. The pointer data may include data for locating the media on the resource servers 105 (or the database storage 268 if a collaborative computing device 103 is not associated with a resource server 105 that stores media). In one embodiment, a keyword may be associated with a plurality of media.

In one embodiment, the indexing service 287 creates and maintains a global database index. The global database index is a master index that is comprised of database indices created separately for the one or more resource servers 105. The indexing service 287 determines one or more types of updates occurring in the one or more resource servers 105, retrieves the database indices of the one or more resource servers and compiles the global index. The global index holds the database indices of the one or more resource servers 105 and consequently pointer references pointing to a location of one or more source materials relating to the database indices. The global index also holds the keywords for the media associated with the one or more resource servers 105 so that the search engine 221 can query the global index for the keywords and receive the pointer references for retrieving the media from the one or more resource servers 105.

The one or more source materials are associated with the one or more types of updates occurring in the one or more resource servers 105. The one or more types of updates include storing, deleting or moving at least one of a presentation program document, a text document, a spreadsheet document, a video recording, an audio recording, an image, etc. For example, a global database index comprises a first database index on a user identifier from a first resource server 105*a* associated with a projector device, a second database index on a device identifier from a second resource server 105*b* associated with a video conferencing device, and so on. In another embodiment, the indexing service 287 creates a global database index that includes pointer references that point to the database indices in the one or more resource servers 105*a*-105*n*. In one embodiment, the indexing service 287 stores the global database index in the data storage 268.

The indexing service 287 updates a user profile for an author or presenter based on one or more keywords. A user profile for the author or presenter may include a list of keywords relating to content in the media associated with the author or presenter. The indexing service 287 updates the user profile by adding the one or more keywords to the list of keywords to the user profile associated with the unique user identifier. In one embodiment, the user profile for the author includes metadata describing the media associated with the author or presenter. The metadata may include the list of keywords, presentation information (e.g., a date, location and device information), media information (e.g., uniform resource locator or document/file identifier of media authored), etc. If the author gives the same presentation information at multiple events, in one embodiment, the presentation information includes multiple dates and locations associated with the presentation.

The calendar module 286 is code and routines for creating one or more events in a calendar for a user. In one embodiment, the calendar module 286 is a set of instructions executable by the processor 262 to provide the functionality described below for creating events in a calendar. In another embodiment, the calendar module 286 is stored in the memory 264 and is accessible and executable by the processor 262. In either embodiment, the calendar module 286 is adapted for cooperation and communication with the processor 262 and the communication unit 266 via signal line 282.

In one embodiment, the calendar module 286 receives a request from a user via the workflow engine 201 to create one or more events in one or more calendars associated with the user. The one or more calendars (for e.g., a personal calendar, a bill payment calendar, etc.) and the event data (for e.g., a title, a start time, an end time, a start date, an end date, a number of attendees, etc.) associated with the calendars are stored in the data storage 268. For example, the calendar module 286 receives a request from the user to create an event "Staff Meeting" in a time slot between "10 AM" and "11 AM" on a "Tuesday". In one embodiment, the calendar module 286 receives a list of attendees from the user via the workflow engine 201 to be associated with the event. The user creates a list of attendees by inviting the attendees to the event using a name, a user identifier, an employee identifier, etc. For example, a team leader can invite members in an engineering department to attend the event "Staff Meeting". In one embodiment, the calendar module 286 generates an access control list for the calendar event based on the list of attendees and stores the access control list in the data storage 268. In another embodiment, the calendar module 286 sends the access control list to the workflow engine 201 in the enterprise service bus 107. The workflow engine 201 sends the access control list to the device management engine 203 for determining devices associated with people in the access control list. In one embodiment, the calendar module 286 receives a selection of a location from the user where the event is to take place and transmits the selection of location to the workflow engine 201. The workflow engine 201 sends the selection of location to the device management engine 203 for determining a list of available collaborative computing devices at the selected location. For example, the user can select a first available conference room "conference room 301" on a third floor of a building.

The billing service 267 is code and routines for generating a bill for a user. In one embodiment, the billing service 267 is a set of instructions executable by the processor 262 to provide the functionality described below for generating and storing billing information. In another embodiment, the billing service 267 is stored in the memory 264 and is accessible and executable by the processor 262. In either embodiment, the billing service 267 is adapted for cooperation and communication with the processor 262 and the communication unit 266 via signal line 291.

The device usage data is stored by the device usage analytics engine 213 in the data storage 268. The workflow engine 201 retrieves the data associated with device usage from the device usage analytics engine 213 and provides the data to the billing service 267. In one embodiment, the billing service 267 determines a cost associated with the device usage of a single device. For example, the billing service 267 determines that the cost of using a Magnetic Resonance Imaging (MRI) device to image the spine of a patient is 2000 dollars. The billing service 267 then generates a bill based on the cost associated with the device usage and sends the bill to the workflow engine 201 or stores the bill in the data storage 268. In another embodiment, the billing service 267 determines a cost associated with a user device 102 accessing a plurality of collaborative computing devices 103. For example, the billing service 267 generates a bill for the user device 102 accessing a printer, a projector, conferencing services, etc. for the month of November.

The search engine 221 is software and routines for identifying media related to a search query of one or more terms. In one embodiment, the search engine 221 is a set of instructions executable by the processor 262 to provide the functionality described below for identifying media related to a search query. In another embodiment, the search engine 221 is stored in the memory 264 and is accessible and executable by the processor 262. In either embodiment, the search engine 221 is adapted for cooperation and communication with the processor 262 and the communication unit 266 via the signal line 249.

The search engine 221 receives one or more search queries from the workflow engine 201 for one or more resource servers 105*a*-105*n*. In one embodiment, the search queries originate at the search server 120. The search engine 221 identifies, from the database indices one or more keywords that match one or more terms in the search queries, determines the one or more resource servers the request is bound for and sends the determination of the one or more resource servers to the workflow engine 201. For example, the search engine 221 accesses a global database index for identifying one or more keywords matching one or more terms in the search queries and determines the one or more resource servers are associated with a projector, an interactive whiteboard, etc. In one embodiment, the search engine 221 identifies keywords by searching for exact matches to a term in the search query. In another embodiment, the search engine 221 identifies keywords by searching for keywords similar to the term in the search query. For example, if the requestor provides the term "open source operating system," the search engine 221 may identify "Linux" as a keyword from the database index.

In one embodiment, the search engine 221 receives the search query from the workflow engine 201. In one embodiment, the search engine 221 identifies one or more types of media associated with the keywords and user profiles for authors or presenters of the media. In another embodiment, the database index includes data describing an association between a keyword and media. For example, if a search query term, such as, "Linux" is received, the search engine 221 identifies a user identifier, a device identifier, date of event, etc. as database indices and using the database indices retrieves from the one or more resource servers 105*a*-105*n* one or more of a presentation program document, a text document, a spreadsheet document, a video file, an audio file, an image, etc. for the search query term, "Linux" and sends the retrieved information to the enterprise service bus 107.

In one embodiment, the search engine 221 identifies a number of times a keyword appears in the retrieved media. For example, the search engine 221 determines the number of times the keyword appears in an image of one or more slides or on an interactive whiteboard. In another example, the search engine 221 determines the number of times the author says the keyword in audio (the audio is subjected to speech-to-text translation by the media analysis service 217). The search engine 221 ranks the media retrieved from the one or more resource servers 105a-105n based on a number of times the keyword appears in the media.

The server maintenance service 227 is software and routines for managing one or more resource servers. In one embodiment, the server maintenance service 227 is a set of instructions executable by the processor 262 to provide the functionality described below for managing one or more resource servers. In another embodiment, the server maintenance service 227 is stored in the memory 264 and is accessible and executable by the processor 262. In either embodiment, the server maintenance service 227 is adapted for cooperation and communication with the processor 262 and the communication unit 266 via signal line 251.

In one embodiment, the server maintenance service 227 receives a request from the workflow engine 201 for procuring a server license for one or more resource servers 105a-105n. For example, the license is an operating system license for an operating system installed on the resource server 105. In another example, the server license is per physical resource server (or per virtual instance of the resource server), per socket (or per CPU) in the resource server 105 and per total number of cores in the resource server 105. In another embodiment, the server maintenance service 227 receives a request for procuring a connection license to allow one or more types of devices to connect to the one or more resource servers 105 and use software distributed by a manufacturer of the one or more types of devices. The connection license is one from a group of per device licenses that connects to the resource server 105 (for e.g., 45 projector devices connecting to a resource server for a projector device includes 45 connection licenses), per concurrent connection to the resource server 105 (for e.g., 25 unique sessions open concurrently at any one time to the resource server 105 per 45 projector devices) and per user account (for e.g., using a username and password for a unique connection regardless of type of device used to connect to the resource server 105).

In one embodiment, the server maintenance service 227 determines compatibility of one or more types of devices with the one or more resource servers 105 by accessing a hardware compatibility list (HCL) associated with the one or more resource servers 105. A hardware compatibility list (HCL) is a database of hardware models and their compatibility, for example, with a certain operating system on a resource server 105 and is stored in the data storage 268.

In one embodiment, the server maintenance service 227 determines one or more updates to an Application Programming Interface (API) associated with one or more types of collaborative computing devices 103 that are associated with one or more resource servers 105. The one or more updates include software updates and firmware updates. The Application Programming Interface (API) associated with one or more types of collaborative computing devices 103 is exposed by the enterprise service bus 107 to the user devices 102a-102n. The server maintenance service 227, responsive to determining the one or more updates, sends a notification to the enterprise service bus 107 to update its internal engines so that the protocol adaptation engine 205, the message transformation engine 207 and the message enhancement engine 209 are prepared to deal with any updates that occur in the APIs of the collaborative computing devices 103. This avoids a situation where the user has to manually install updates on the resource servers 105.

The notification service 269 is code and routines for generating notifications in the network 104. In one embodiment, the notification service 269 is a set of instructions executable by the processor 262 to provide the functionality described below for generating and issuing notifications. In another embodiment, the notification service 269 is stored in the memory 264 and is accessible and executable by the processor 262. In either embodiment, the notification service 269 is adapted for cooperation and communication with the processor 262 and the communication unit 266 via signal line 292.

In one embodiment, the notification service 269 receives the bill from the workflow engine 201 or retrieves the bill from data storage 268 and generates a notification indicating that the bill is ready. The notification is sent to the workflow engine 201, which transmits the notification to the user device 102 or an email account of a user using the user device 102. In another embodiment, the notification service 269 generates a notification indicating when to replace one or more types of devices based on the device usage. For example, the notification service 269 determines that a projector is nearing its lifetime based on the number of hours the projector has been used and generates a notification to send to the service personnel.

The notification service 269 receives an access control list and event information associated with a calendar event from the workflow engine 201. In one embodiment, the notification service 269 generates a notification to query the user that created the calendar event whether to start the calendar event at start time. For example, the notification service 269 generates a notification five minutes before the scheduled start time so a projector device is warmed up if the user agrees to start the event. In one embodiment, the workflow engine 201 receives a request from the calendar module 286 to alert users about the start of the event. The workflow engine 201 instructs the notification service 269 to generate a notification requesting the user to start the calendar event when all the users in the access control list are present at the calendar event. In another embodiment, the workflow engine 201 instructs the notification service 269 to generate a notification requesting other participants to delay the start of the event when at least one user is absent at the venue. For example, if a user for a staff meeting is held up in traffic five miles from the venue, a notification is generated to delay the staff meeting.

In one embodiment, the notification service 269 determines the end of the calendar event when the workflow engine 201 receives a request from the calendar module 286 to ask users if they want to end the event. The workflow engine 201 instructs the notification service 269 to generate a notification asking the list of users participating whether they want to end the event. Responsive to receiving a confirmation from at least one of the users in the list, the workflow engine 201 transmits the confirmation to power off all the devices at the venue to the device management service 212. In another embodiment, the notification service 269 receives a list of devices from the workflow engine 201 that are idle for a set amount of time and the workflow engine 201 instructs the notification service 269 to generate a notification indicating the list of devices which are idle and providing an option to power off the devices in the list. For example, an employer leaving a parking lot after attending a group meeting inside a building can be notified by the notification service 269 that a projector, an interactive whiteboard, a web camera, etc. in the conference room are idle. The user can send a request to power off all the devices responsive to receiving the notification from the notification service 269. The workflow engine 201 transmits the request from the user to power off to the device management service 212.

Example User Interfaces

Figure 3:
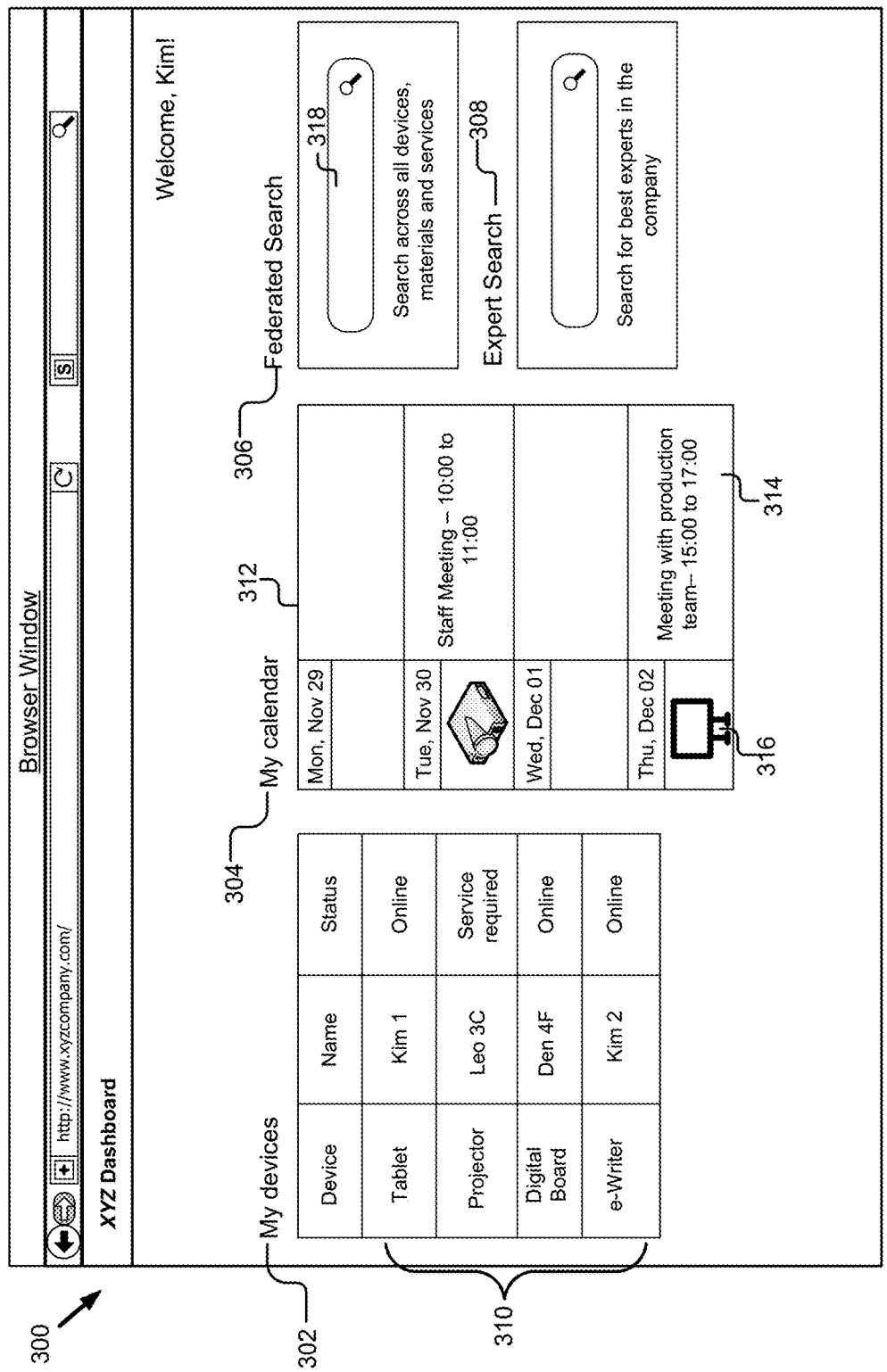
FIG. 3 is a graphic representation of an embodiment of a user interface for displaying a webpage providing an overview of services for a user.

Turning now to FIG. 3, a graphic representation of an embodiment of a user interface 300 for displaying a webpage providing an overview of services for a user that is generated by the user interface engine 121. The user interface 300 includes a number of services, for example, "My devices" section 302, "My calendar" section 304, "Federated search" section 306 and "Expert search" section 308. The "My devices" section 302 displays a list 310 of the user's devices, device names (or device locations) and device statuses in a table. The listed devices include one or more user devices 102 of the user, for example, a tablet PC and one or more collaborative computing devices 103 that were reserved by the user, for example, a projector. The "My calendar" section 304 displays a miniature calendar 312 of the user. The miniature calendar 312 displays an event entry 314 and a thumbnail representation 316 of a collaborative computing device reserved for the event. The "Federated search" section 306 displays a search box 318 for the user to input search terms for media. The search results display one or more types of media from one or more resource servers 105a-105n or from the database storage 268 (that was stored by the media repository service 215) matching the search terms. The "Expert search" section 308 displays a similar search box for the user to input search terms on a particular subject and find users with varying degrees of expertise on the particular subject. The search results display a list of users matching one or more keywords in the search terms and associated media presented by the users including the one or more keywords.

Figure 4:
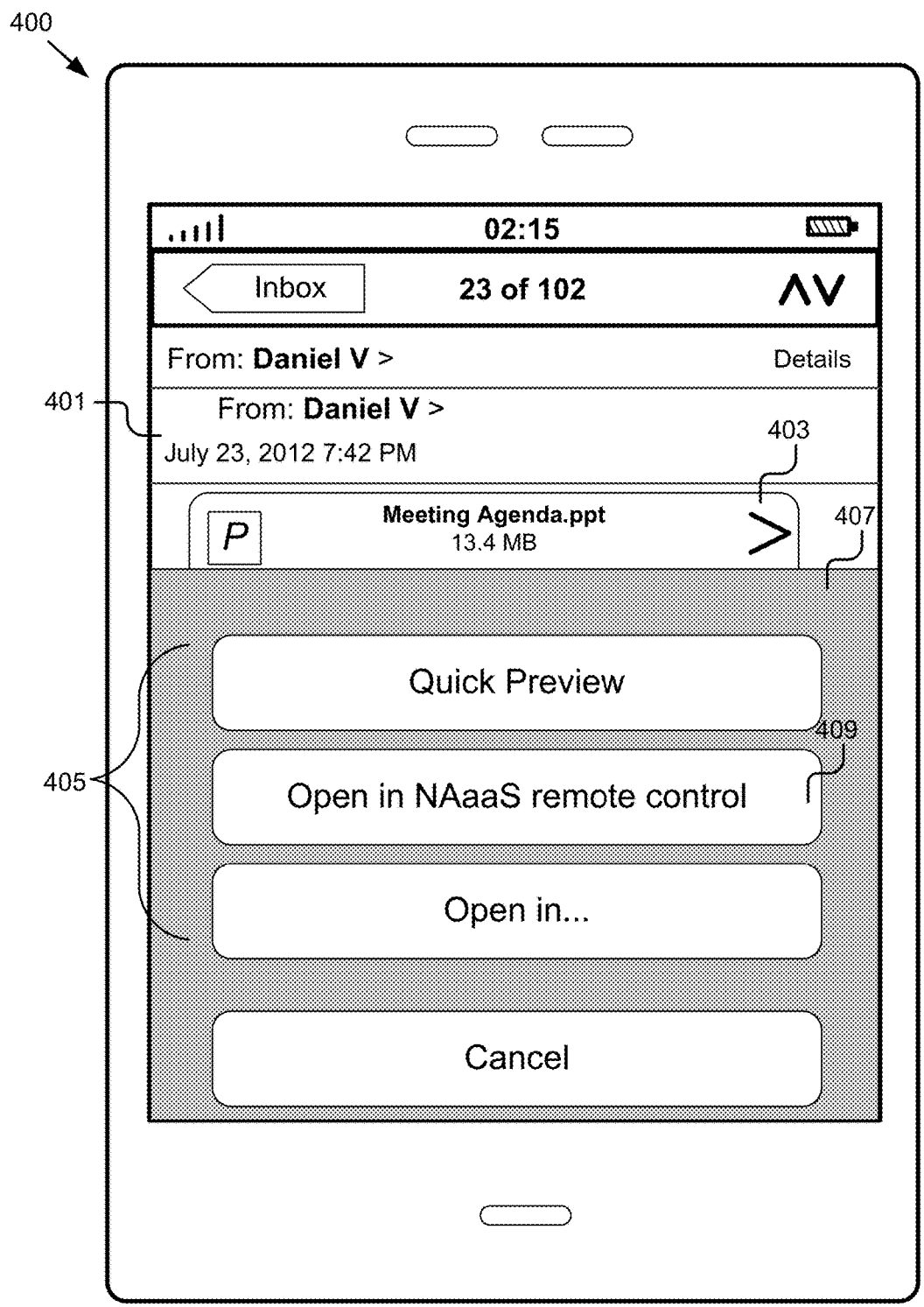
FIG. 4 is a graphic representation of an embodiment of a user interface for selecting a media type for viewing on a collaborative computing device.

FIG. 4 is a graphic representation of an embodiment of a user interface 400 for selecting a media type for viewing on a collaborative computing device such as a projector device. The user interface 400 displays a message 401 in an inbox on a smartphone of a user. The message 401 includes an attachment 403. When the user selects the attachment 403, an overlay 407 pop ups proposing a list 405 of options on how to open the attachment 403 including preview, open with NAaaS remote control, open in or cancel. Upon selecting "Open with NAaaS remote control" option 409 the user is directed to another user interface for selecting a location where at the attachment 403 should be displayed and is explained in further detail with reference to FIG. 5.

Figure 5:
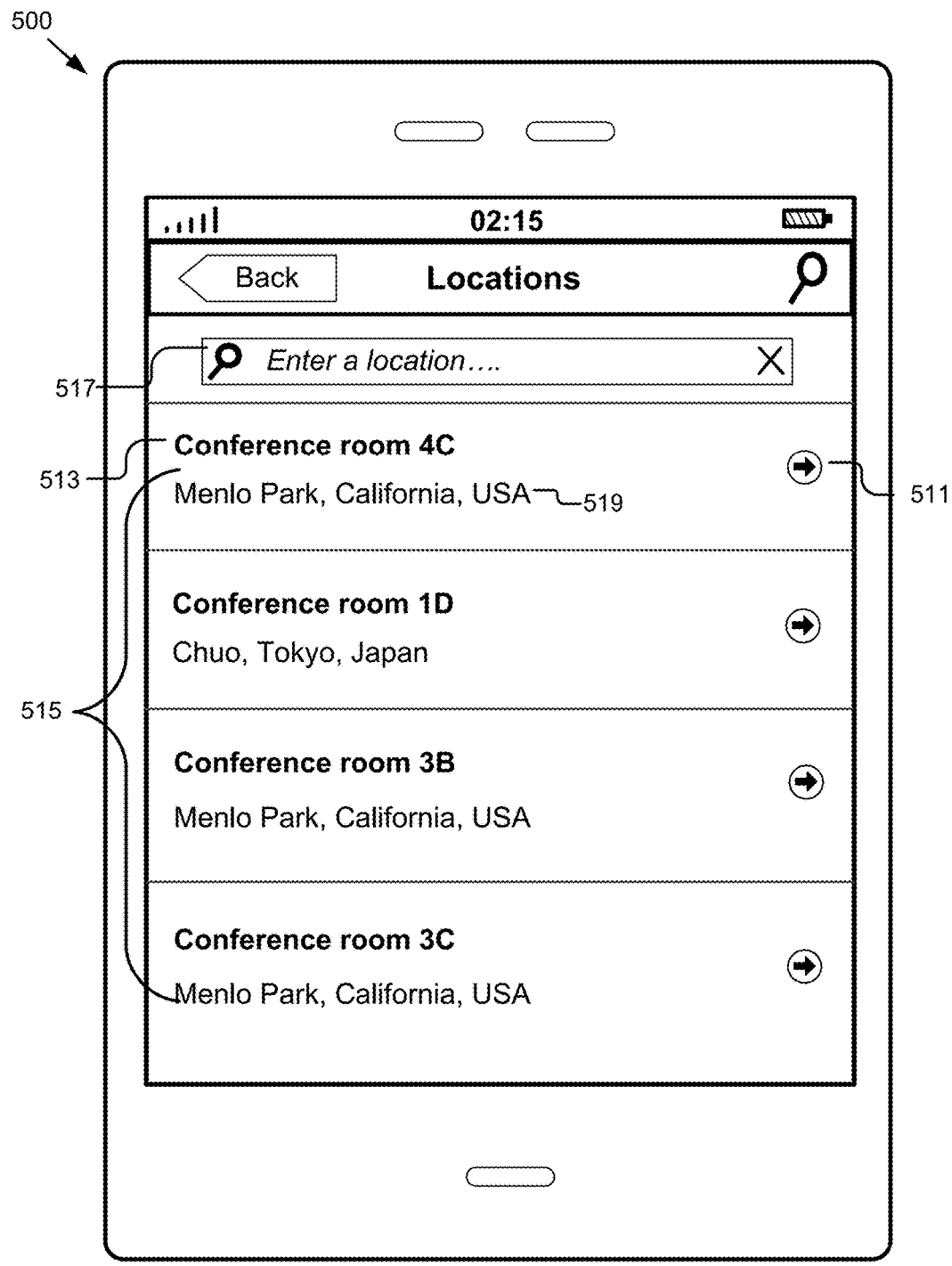
FIG. 5 is a graphic representation of an embodiment of a user interface for selecting a location to send a media for display.

FIG. 5 is a graphic representation of an embodiment of a user interface 500 for selecting a location to send a media for display. FIG. 4 could be the next screen that a user sees after selecting the "Open in . . . " option from the list 405 of options in FIG. 4 or it could be related to a different step, for example, a situation where the user wants to see devices associated with a particular location. The user interface 500 includes a search box 517 for entering a location to search. The user interface 500 includes a list 515 of locations which the user can select to send the media for display. Each item in the list 515 includes a name 513 of the location and an address 519 of the location. Upon selecting the button 511 for "Conference room 4C" the user is directed to another user interface that displays a list of devices and is explained in further detail with reference to FIG. 6.

Figure 6:
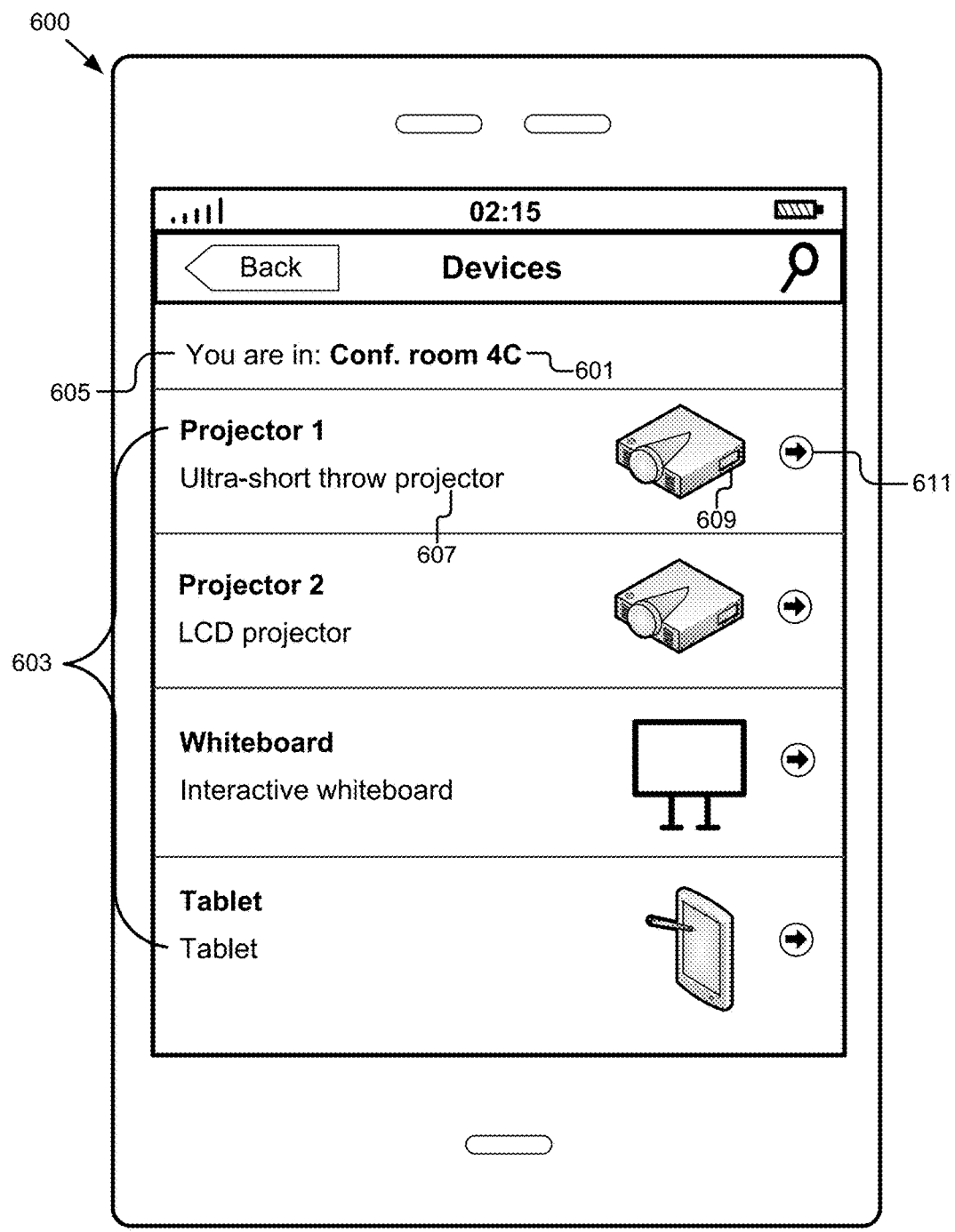
FIG. 6 is a graphic representation of an embodiment of a user interface for displaying a list of devices at a location or within a set distance of a user device.

Turning now to FIG. 6, a graphic representation of an embodiment of a user interface 600 for displaying a list of devices at a location or within a set distance of a user device such as a smartphone. The user interface 600 displays a list 603 of devices detected at a location 601 named "Conf. room 4C". The list 603 of devices includes one or more collaborative computing devices 103. Each item of the list 603 includes a device name 605, a short description 607 of the device and a thumbnail representation 609 of the device. Upon selecting the button 611 for "Projector 1" the user is directed to another user interface for sending a command to the selected device "Projector 1" which is explained in further detail with reference to FIG. 7.

Figure 7:
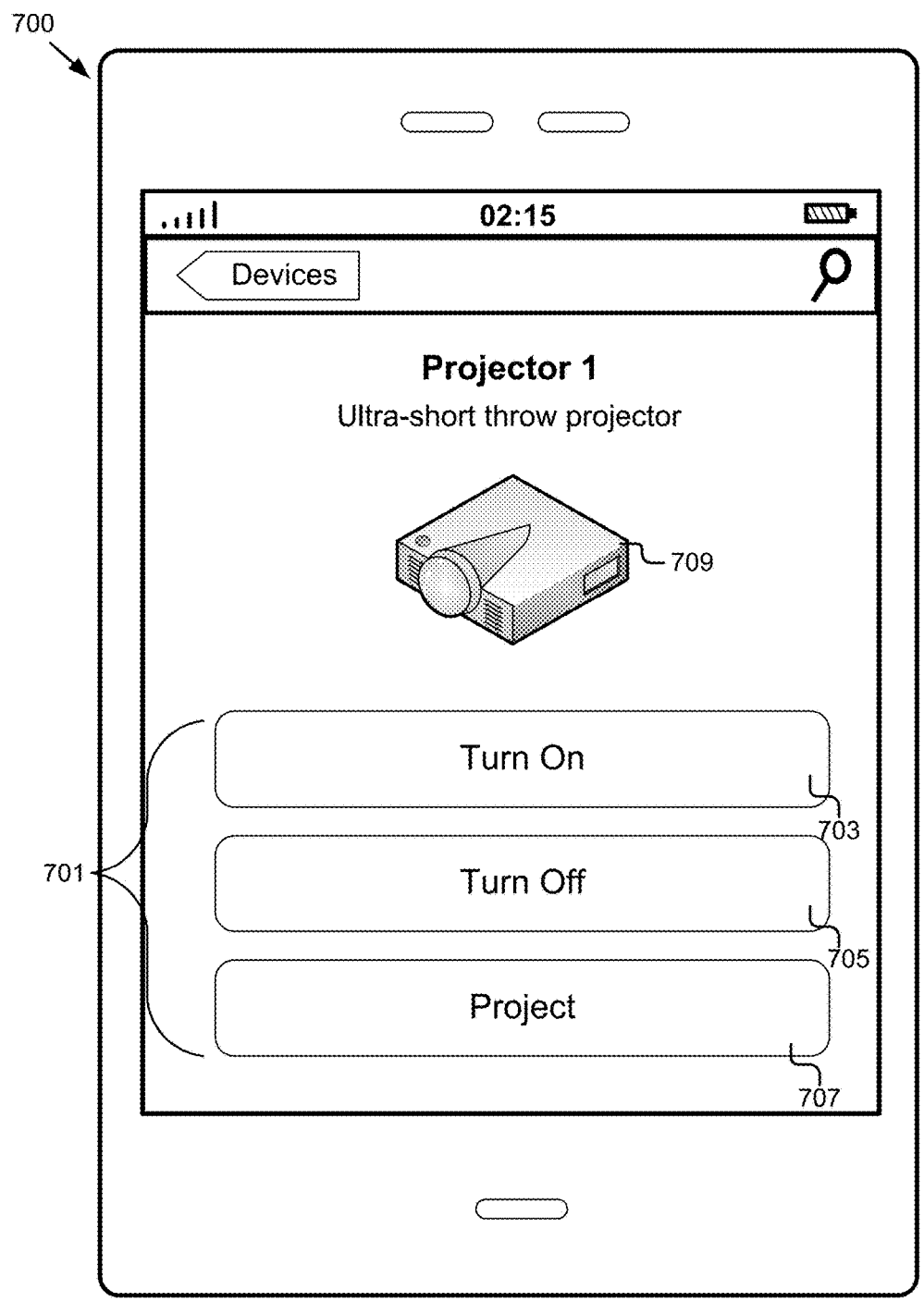
FIG. 7 is a graphic representation of an embodiment of a user interface for displaying a list of commands to send to a selected collaborative computing device from a user device 102.

FIG. 7 is a graphic representation of an embodiment of a user interface 700 for displaying a list of commands to send to a selected collaborative computing device (e.g., projector) from a user device 102 such as a smartphone. FIG. 7 could be the next screen that is displayed after selecting a location from the list 415 in FIG. 5. FIG. 7 would not, however, be displayed if the user went from FIG. 4 to FIG. 5 because the user would have already selected the source material (attachment 303) to display on the collaborative computing device 105 in FIG. 3. The user interface 700 displays a thumbnail representation 709 of the selected device "Projector 1". In one embodiment, the user interface 700 displays the list 701 of commands that is reached responsive to the user clicking button 611 for "Projector 1" in FIG. 6. The user can turn on the device "Projector 1" by clicking on the tab 703 for "Turn On", turn off the device "Projector 1" by clicking on the tab 705 for "Turn Off" and project an item on the device "Projector 1" by clicking on the tab 707 for "Project". Upon clicking on the tab 707 for "Project" the user is directed to another user interface for selecting a source of operation which is explained in further detail with reference to FIG. 8.

Figure 8:
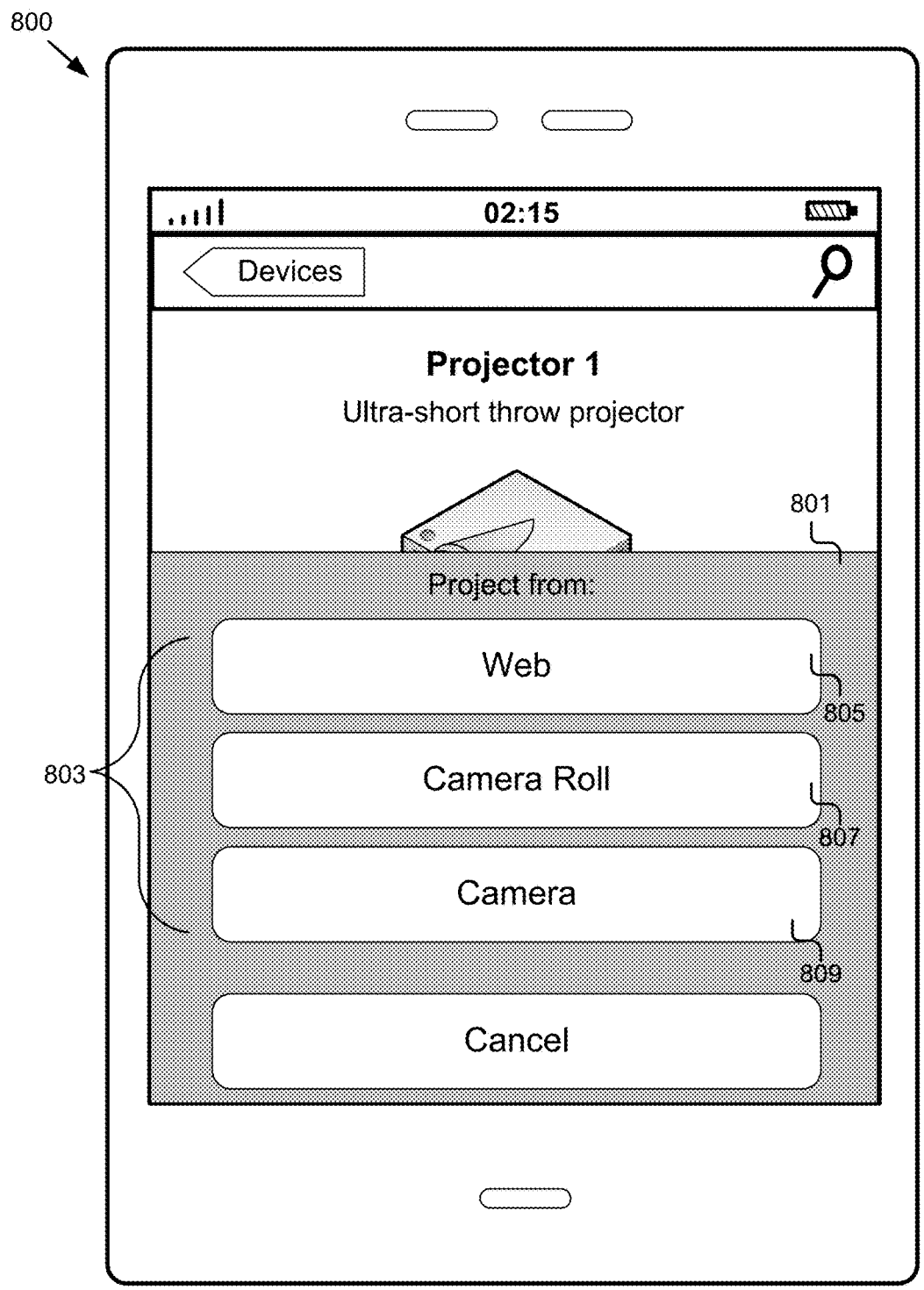
FIG. 8 is a graphic representation of an embodiment of a user interface for displaying a list of options to select a source for displaying a document on a collaborative computing device.

FIG. 8 is a graphic representation of an embodiment of a user interface 800 for displaying a list of options to select a source of operation for a selected collaborative computing device (e.g., projector) from a user device 102 such as a smartphone. The user interface 800 includes an overlay 801 over the display of the user device 102. The overlay 801 displays a list 803 of source of operations for the selected device "Projector 1". The user can project from the web onto the device "Projector 1" by clicking on the tab 805 for "Web". The user can project from a memory associated with the user device 102 onto the device "Projector 1" by clicking on the tab 807 for "Camera Roll". The user can project from a camera associated with the user device 102 onto the device "Projector 1" by clicking on the tab 809 for "Camera".

Figure 9:
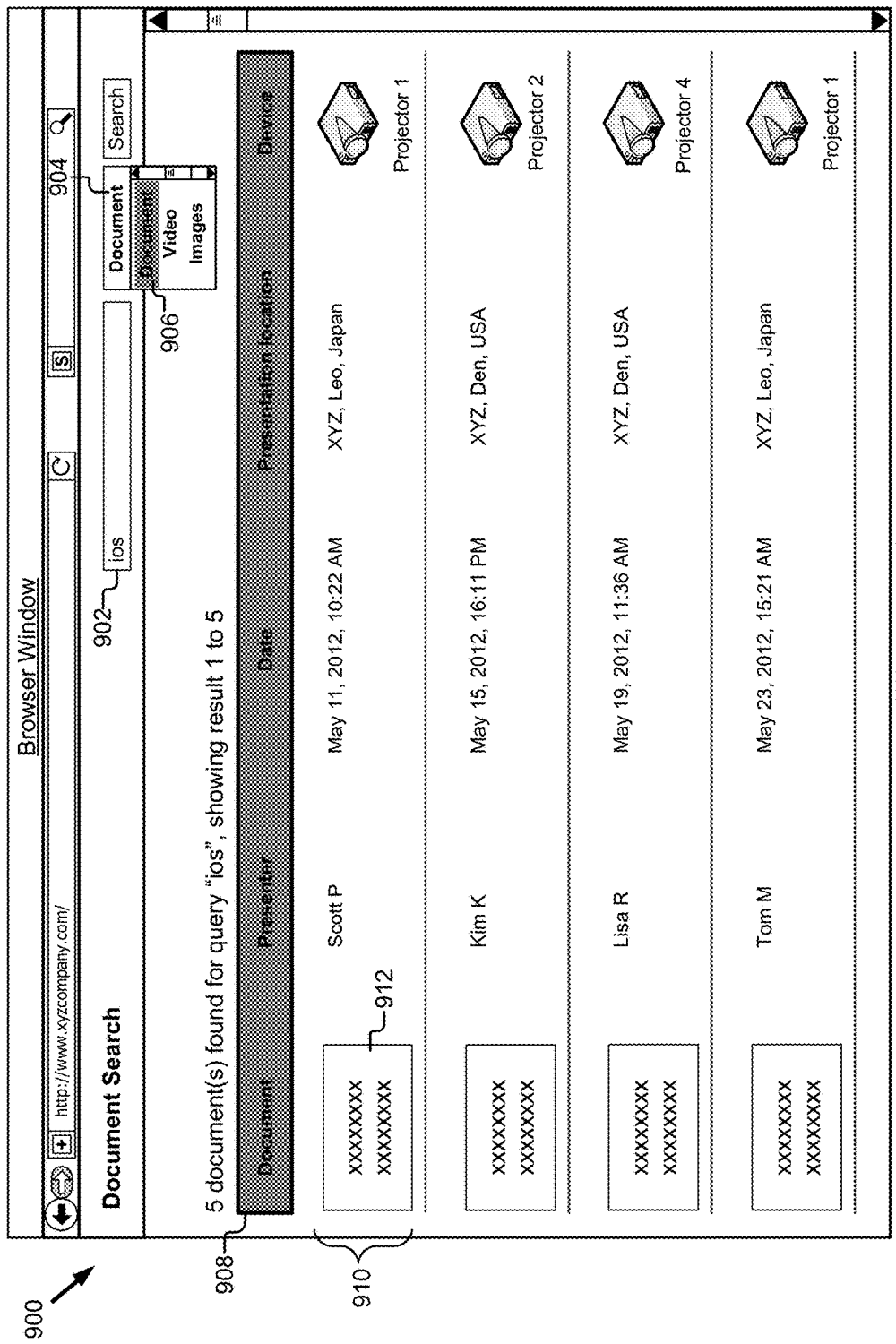
FIG. 9 is a graphic representation of an embodiment of a user interface for displaying a list of media.

FIG. 9 is a graphic representation of an embodiment of a user interface 900 for displaying a list of media, such as documents, that match a query. The user interface 900 includes a search box 902 for a user to input one or more query terms, for example, "ios". The user can select the type of media to retrieve from the one or more resource servers by clicking an adjoining option box 904. The option box 904 provides a drop down list where the user can select, for example, an option 906 for "document" and click search. The user interface 900 displays a table 908 providing a list of documents matching the query term "ios". Each row 910 in the table 908 includes a thumbnail representation of a document 912, for example, a presentation program document that the user can click to open. The other information provided in each row of the table 908 include a name of the presenter, a date (for e.g., presentation date), a location (for e.g., presentation location) and a device (for e.g., projector) associated with the document.

Figure 10:
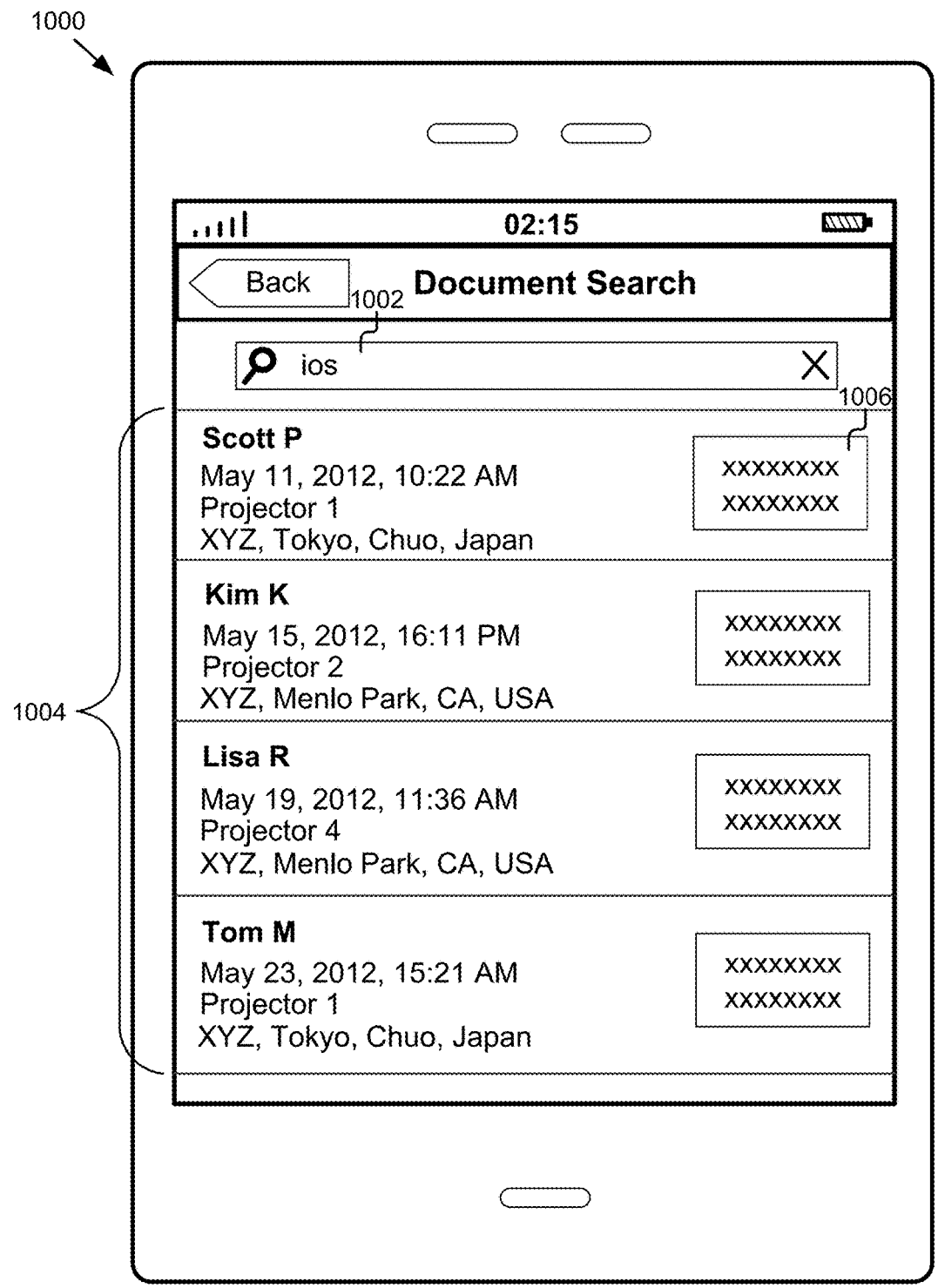
FIG. 10 is another graphic representation of an embodiment of a user interface for displaying a list of media.

FIG. 10 is another graphic representation of an embodiment of a user interface 1000 for displaying a list of media, such as documents, that match a query on a user device 102 such as a smartphone. The user interface 1000 displays a search box 1002 for a user to input one or more query terms, for example, "ios". The user interface 1000 displays a list 1004 of documents matching the query term "ios" in the one or more resource servers. Each entry in the list 1004 includes a thumbnail representation of a document 1006, for example, a presentation program document that the user can select to open. The other information provided in each entry of the list 1004 include a name of the presenter, a date (for e.g., presentation date), a location (for e.g., presentation location) and a device (for e.g., projector) associated with the document.

Figure 11:
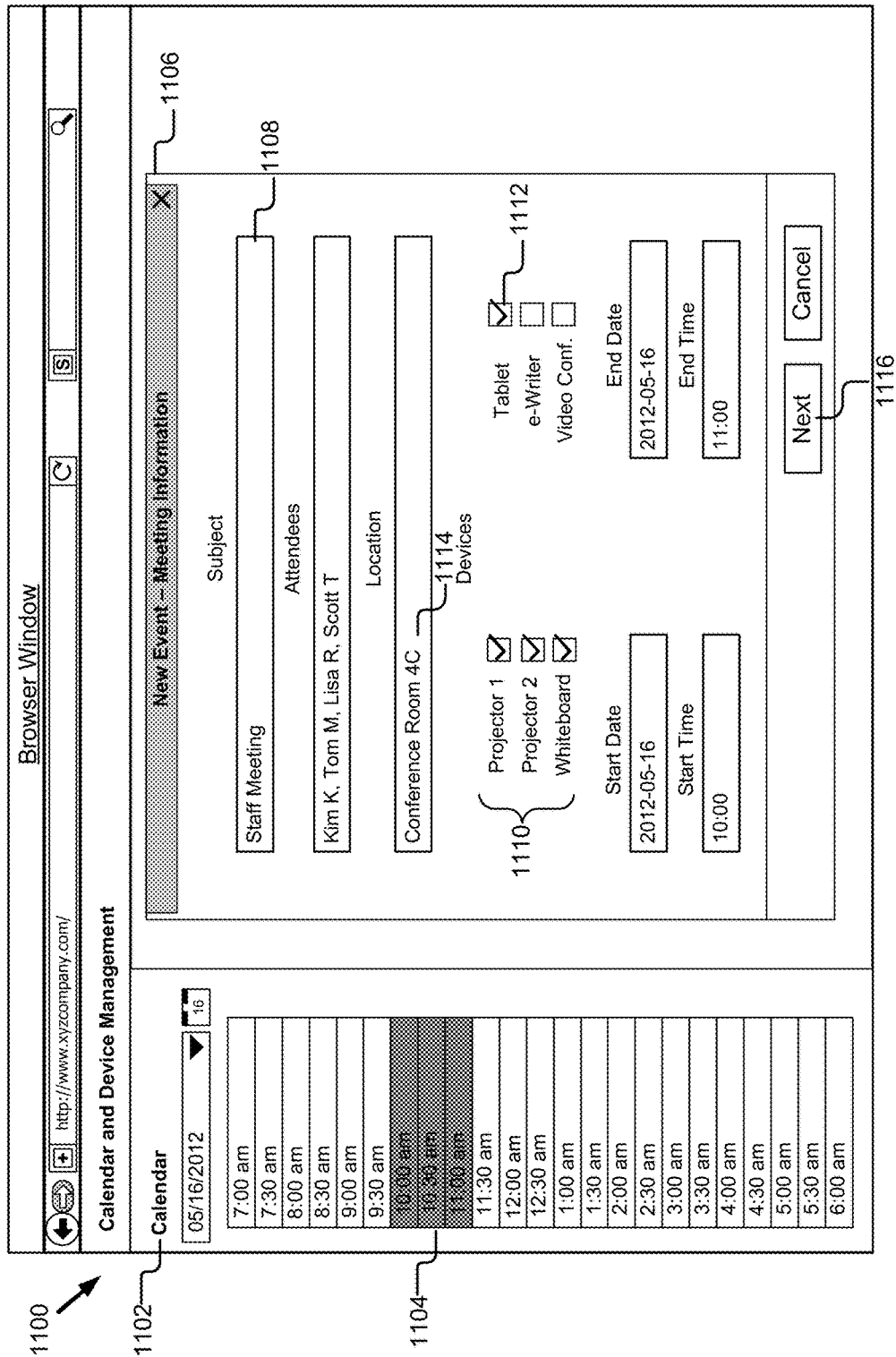
FIG. 11 is a graphic representation of an embodiment of a user interface for creating an event in an electronic calendar for a user.

FIG. 11 is a graphic representation of an embodiment of a user interface 1100 for creating an event in an electronic calendar for a user. The user interface 1100 displays an interactive calendar 1102 in an hourly view mode. Other embodiments are possible where the interactive calendar 1102 is displayed in other view modes, for example, daily, weekly, agenda, etc. When the user selects a time slot 1104 in the interactive calendar 1102 a window 1106 is displayed for entering event information. For example, the user enters the subject of the event by typing "Staff Meeting" into the field 1108 for subject. The other information entered includes attendees for the event, a location of the event, a start date, an end date, a start time, end time, etc. The window 1106 also displays a list 1110 of devices available in a location 1114 named "Conference Room 4C" chosen by the user for the event "Staff Meeting". The user reserves the device for use in the event "Staff Meeting" by checking the radio button 1112 adjacent to the listed device and clicks the button 1116 indicating "Next". Upon clicking the button 1116 the user is directed to another user interface for selecting media to upload to the reserved devices and create the event which is explained in further detail with reference to FIG. 12.

Figure 12:
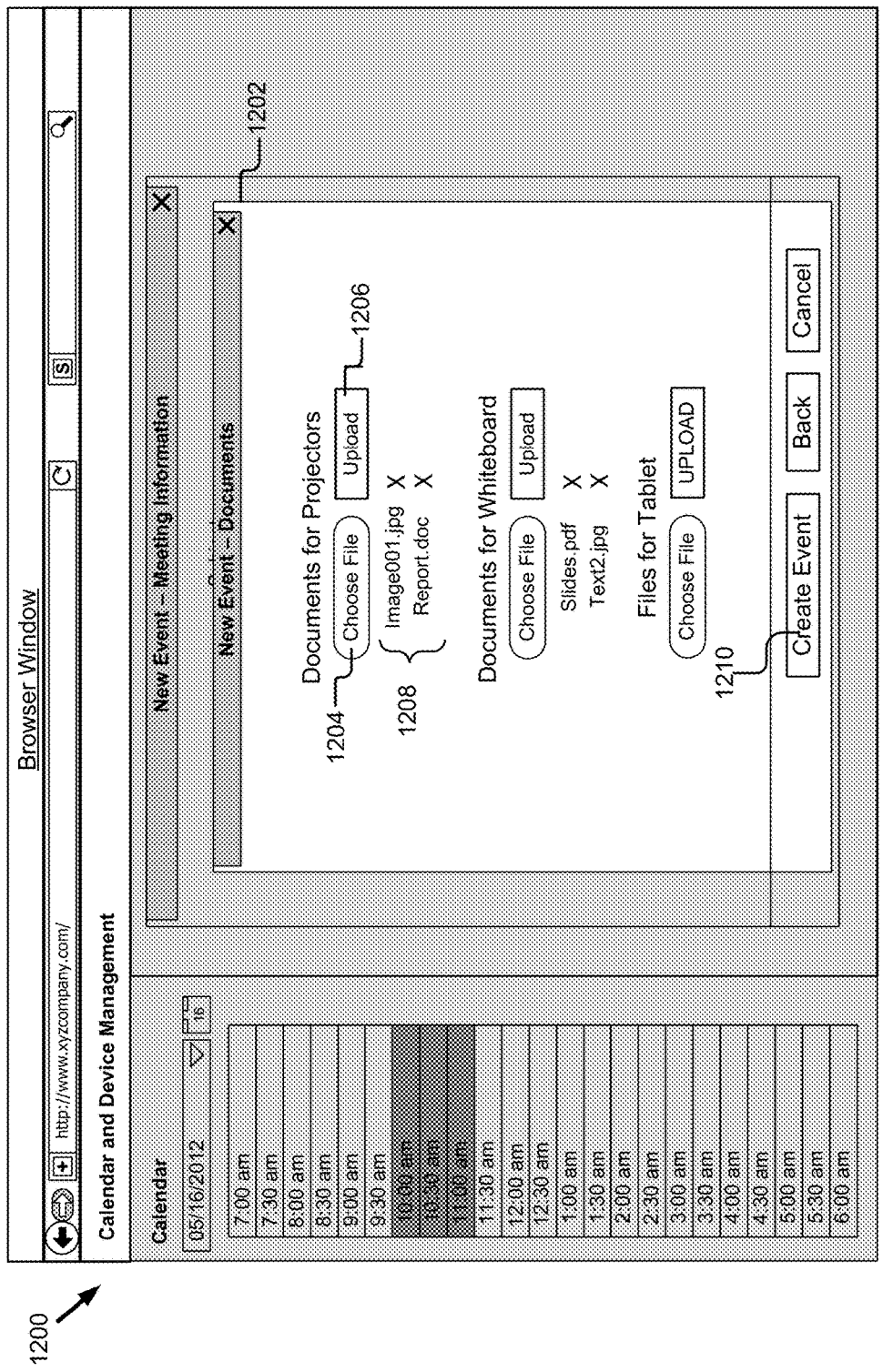
FIG. 12 is a graphic representation of an embodiment of a user interface for selecting media to upload for one or more devices reserved for a calendar event.

FIG. 12 is a graphic representation of an embodiment of a user interface 1200 for selecting media to upload for one or more devices reserved for an event. The user interface 1200 displays a window 1202 as a pop up for selecting and uploading media and is displayed responsive to the user clicking the button 1116 in FIG. 11. In the window 1202 the user can click "Choose file" button 1104 to browse a list of documents (from the internet or a user device 102) and then click "Upload" button 1206. The files that are uploaded to the device are displayed in a list 1208. The user then clicks "Create event" button 1210 to create the event. Upon clicking the button 1210 the user is directed to another user interface that displays an overview of the created event and lets the user makes changes if applicable which is explained in further detail with reference to FIG. 13.

Figure 13:
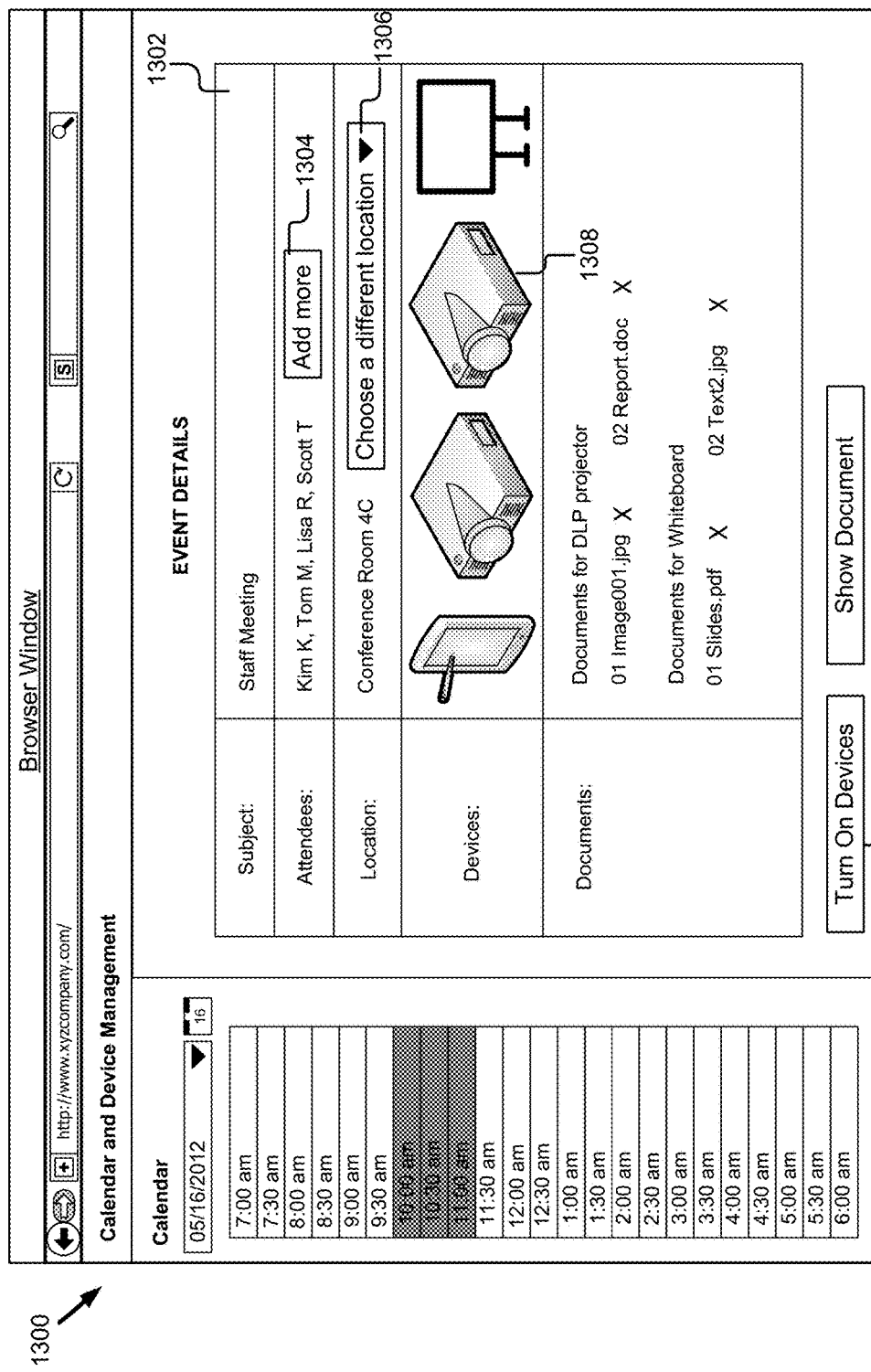
FIG. 13 is a graphic representation of an embodiment of a user interface for providing an overview of the created event in the calendar.

FIG. 13 is a graphic representation of an embodiment of a user interface 1300 for providing an overview of the created event in the calendar and to make changes if applicable. The user interface 1300 displays a window 1302 that lists event information including subject of the event, list of attendees, location of the event, a number of devices reserved for the event and a list of documents uploaded for the devices. In the window 1302 the user can add more attendees if needed to the event "Staff Meeting" by clicking on the "Add more" button 1304. The user can change the location of the event "Staff Meeting" by clicking on the "Choose a different location" drop down menu 1306. The user can select a device 1308 to control and click "Turn On Devices" button 1310.

Figure 14:
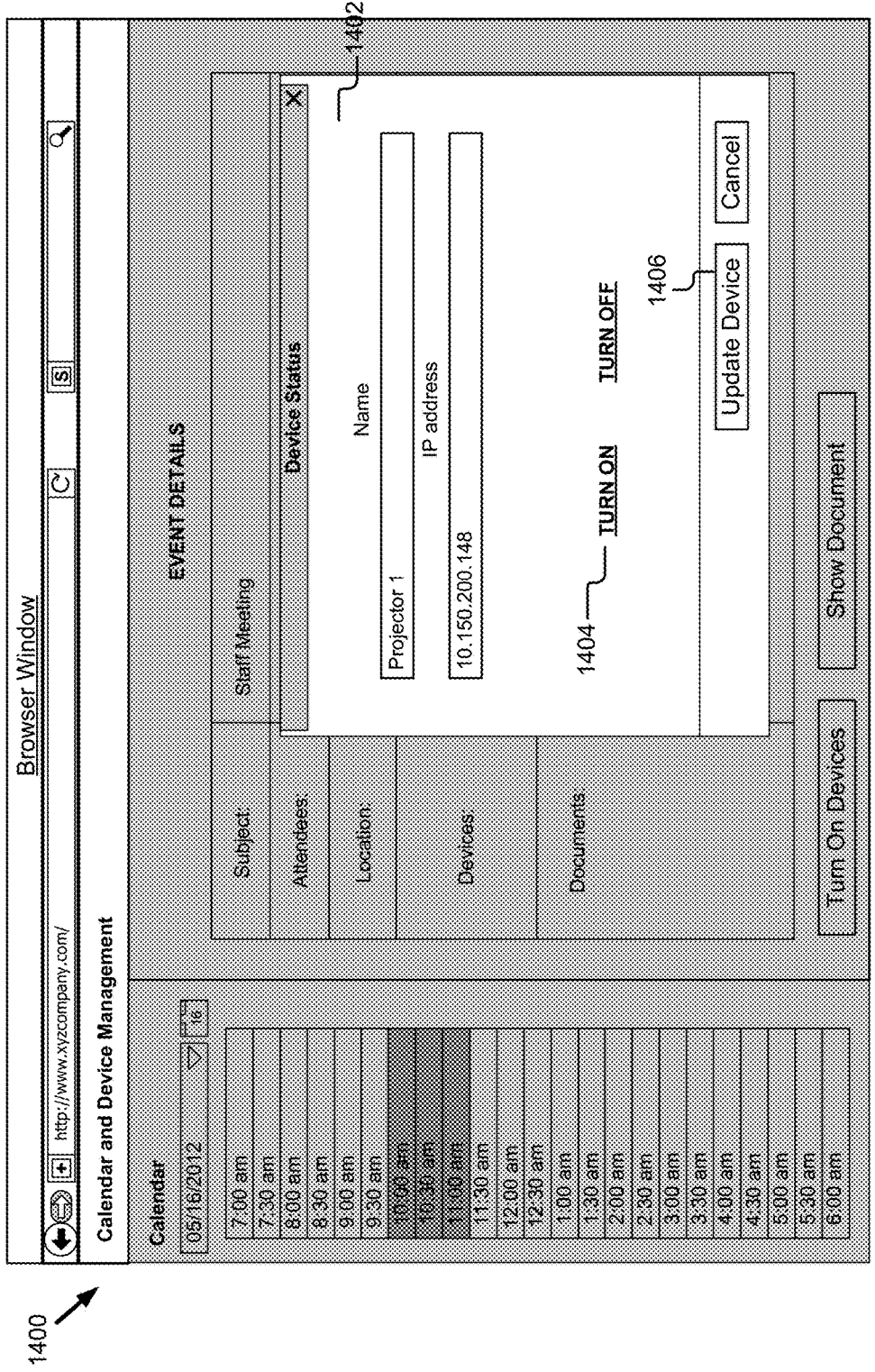
FIG. 14 is a graphic representation of an embodiment of a user interface for specifying configuration settings of a collaborative computing device and for turning them on or off.

FIG. 14 is a graphic representation of an embodiment of a user interface 1400 for specifying configuration settings of a collaborative computing device 105 (name, IP address, etc.) and for turning them on or off. The user interface 1400 displays a window 1402 as a pop up for specifying instruction for the reserved device and is displayed responsive to the user clicking the button 1310 in FIG. 13. In the window 1402 the user could chooses to power on the device (and all other devices) now instead of waiting the for the scheduled time by clicking the "Turn On" link 404 and then clicking the "Update Device" button 1406 for updating the reserved device with this instruction. In another embodiment, the calendar module 286 determines when devices should be turned on in anticipation of a specified meeting time.

Methods

Figure 15:
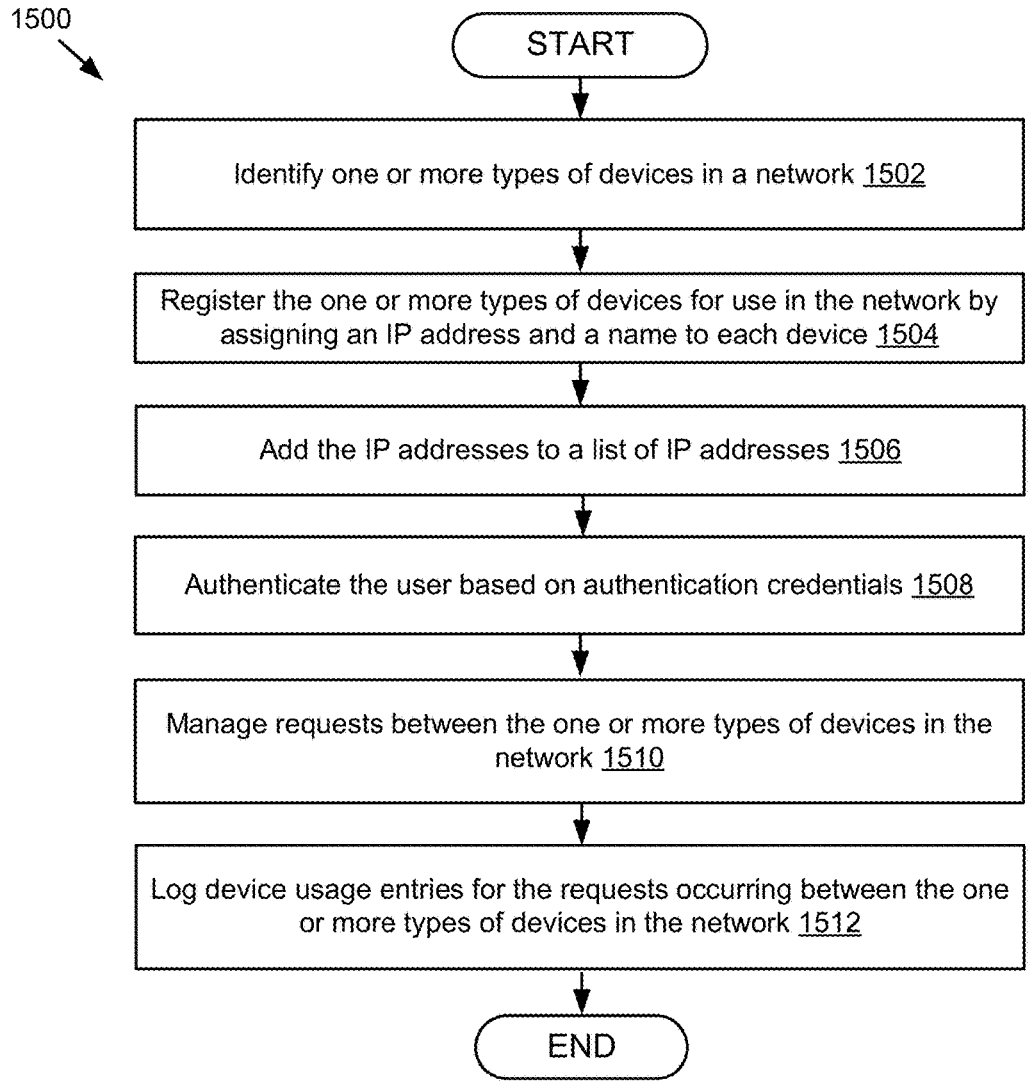
FIG. 15 is a flow diagram of one embodiment of a method for managing communication between one or more types of devices.

Referring now to FIGS. 15-22, various embodiments of the methods will be described. FIG. 15 is a flow diagram 1500 of an embodiment of a method for managing communication between one or more types of devices using an enterprise service bus 107 and NAaaS application services 106. The enterprise service bus 107 includes a workflow engine 201, a device management engine 203, a protocol adaptation engine 205, a message transformation engine 207 and a message enhancement engine 209. The NAaaS application services 106 include a user management service 211, a device management service 212, a device inventory service 265, a location service 299, a device usage analytics service 213, a media repository service 215, a media analysis service 217, an indexing service 267, a calendar module 286, a billing service 267, a search engine 221, a server maintenance service 227 and a notification service 269.

The workflow engine 201 instructs the device management engine 203 to identify 1502 one or more types of devices in a network. The device management engine 203 instructs the device inventory service 265 to register 1504 one or more types of devices for use in the network 404 by assigning an IP address and a name (e.g., a device identifier) to each device. For example, a user can register personal devices such as a tablet PC, a smartphone, etc. and the device inventory service 265 associates the devices with his username or another unique identifier. In another example, a user can register collaborative computing devices 103 such as a projector, an interactive whiteboard, etc. for use at a particular location or within certain limits of space such as a conference room or a floor of a building. The device inventory service 265 adds 1506 the IP addresses to a list of IP addresses. For example, the device inventory service 265 stores a list of approved IP addresses in data storage 268.

In some embodiments, the workflow engine 201 instructs the user management service 211 to authenticate 1508 each user based on authentication credentials. For example, the authentication credentials can be the registered user's login credentials. The protocol adaptation engine 205, the message transformation engine 207 and the message enhancement engine 209 manage 1510 requests between the one or more types of devices in the network. For example, the message transformation engine 207 translates a first message in JSON format into a JMS format. The protocol adaptation engine 205 translates a HTTP protocol from a smartphone into a TCP protocol for a projector. The message enhancement engine 209 adds information (for e.g., additional authentication information, etc.) to the message for the target application to receive. The workflow engine 201 instructs the device usage analytics service 213 to log 1512 device usage entries for the requests occurring between the one or more types of devices in the network 104.

Figure 16A:
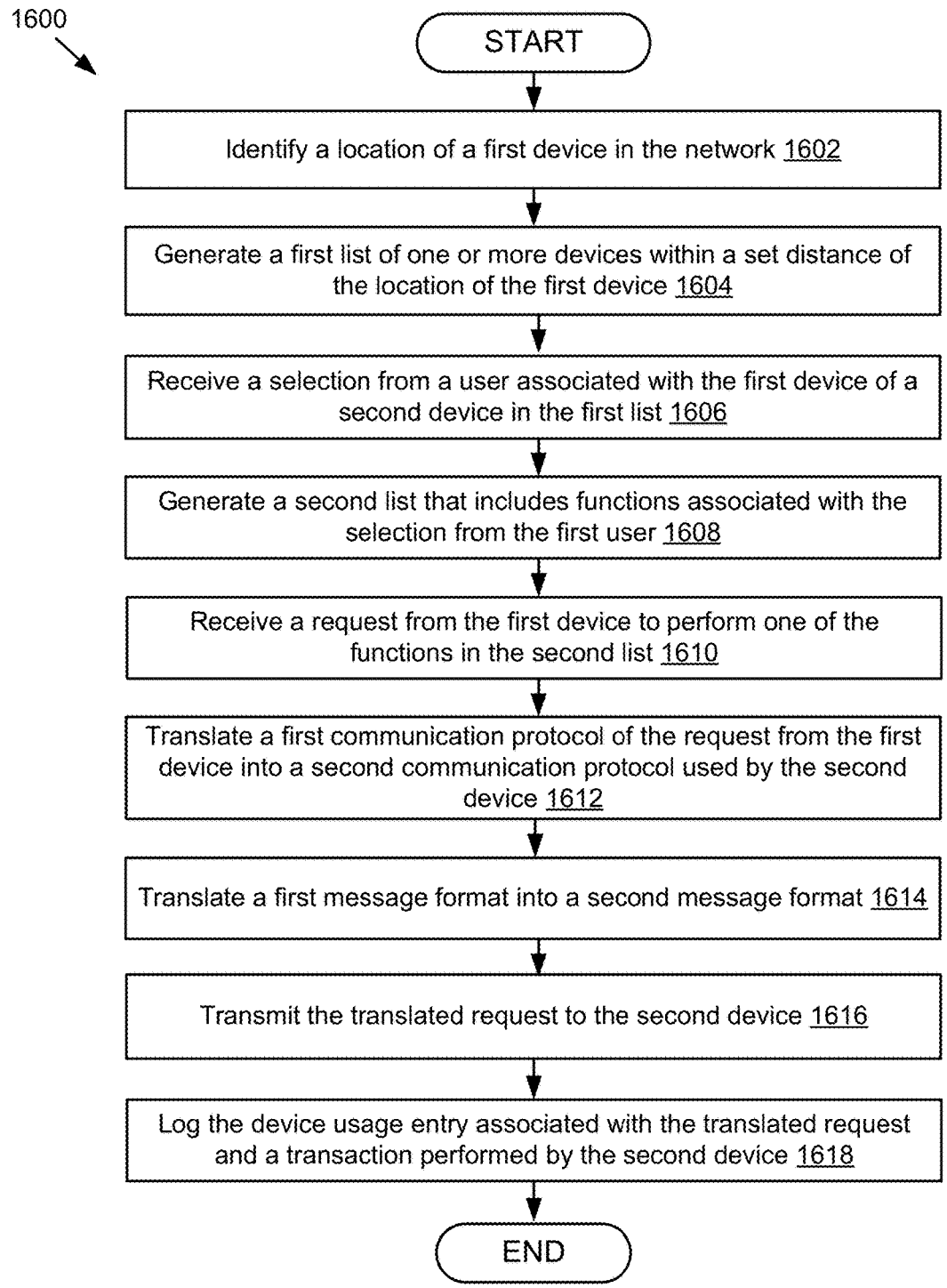
FIG. 16A is a flow diagram of one embodiment of a method for controlling interoperability between different types of devices.

FIG. 16A is a flow diagram 1600 of an embodiment of a method for controlling interoperation between different types of devices by translating requests. The enterprise service bus 107 includes a workflow engine 201, a device management engine 203, a protocol adaptation engine 205, a message transformation engine 207 and a message enhancement engine 209. The NAaaS application services 106 include a user management service 211, a device inventory service 265, a device management service 212, media repository service 215, a media analysis service 217, a billing engine 267, a notification service 269, a location service 299 and a device usage analytics service 213.

The device management engine 203 identifies 1602 a location of a first device in the network and generates 1604 a first list of one or more devices within a set distance of the location of the first device. For example, the user device 102 informs the device management engine 203 of its location and the device management engine 203 interacts with the device inventory service 265 and the location service 299 that are part of the NAaaS application services 106 to generate a list of collaborative computing devices 130 such as a projector, an interactive whiteboard and a web camera that are in a location within a threshold distance of the user device's 102 location. In another embodiment, the user device 102 specifies conference rooms where the user wants to control the devices and the device management engine 203 instructs the device inventory service 265 to generate a list of devices in those conference rooms. In another embodiment, the set distance is the reach of the network 104. FIG. 6 is an example where the device management engine 203 provides the user with a list of the devices available in conference room 4C 313. The device management engine 203 provides the list to the user device 102.

The device management engine 203 receives 1606 a selection from a user associated with the first device of a second device in the first list. The device management engine 203 generates 1608 a second list that includes functions associated with the second device in the first list. FIG. 7 is an example where the user selected a projector from the first list and the second list includes the functions associated with the projector.

The workflow engine 201 receives 1610 a request from the first device to perform one of the functions in the second list. For example, the list of functions include power on, power off, projection, zoom, enhance, automatic focus, print, two-way video recording and transmission, two-way audio recording and transmission, language translation, text to speech translation and speech to text translation, etc. The protocol adaptation engine 205 translates 1612 a first communication protocol of the request from the first device into a second communication protocol used by the second device. The message transformation engine 207 translates 1614 a first message format into a second message format 514. The workflow engine 201 transmits 1616 the translated request to the second device.

The workflow engine 201 instructs the device usage analytics service 213 to log 1618 the device usage entry associated with the translated request and a transaction performed by the second device. For example, the device usage analytics service 213 logs a type of request sent (e.g., project, power on, power off, search, etc.), an IP address for the user device 102 that made the request (e.g., smartphone, laptop, etc.), a user identifier for the user associated with the user device 102, an IP address for the collaborative computing device 103 that receives the request (e.g. projector, laptop, conferencing device, etc.), a type of functionality used (e.g., auto-focus, enhance, imaging, etc.) and a type of media that is being exchanged between the one or more devices (e.g., a presentation program document, a text document, a spreadsheet document, a video recording, an audio recording, an image, etc.).

Figure 16B:
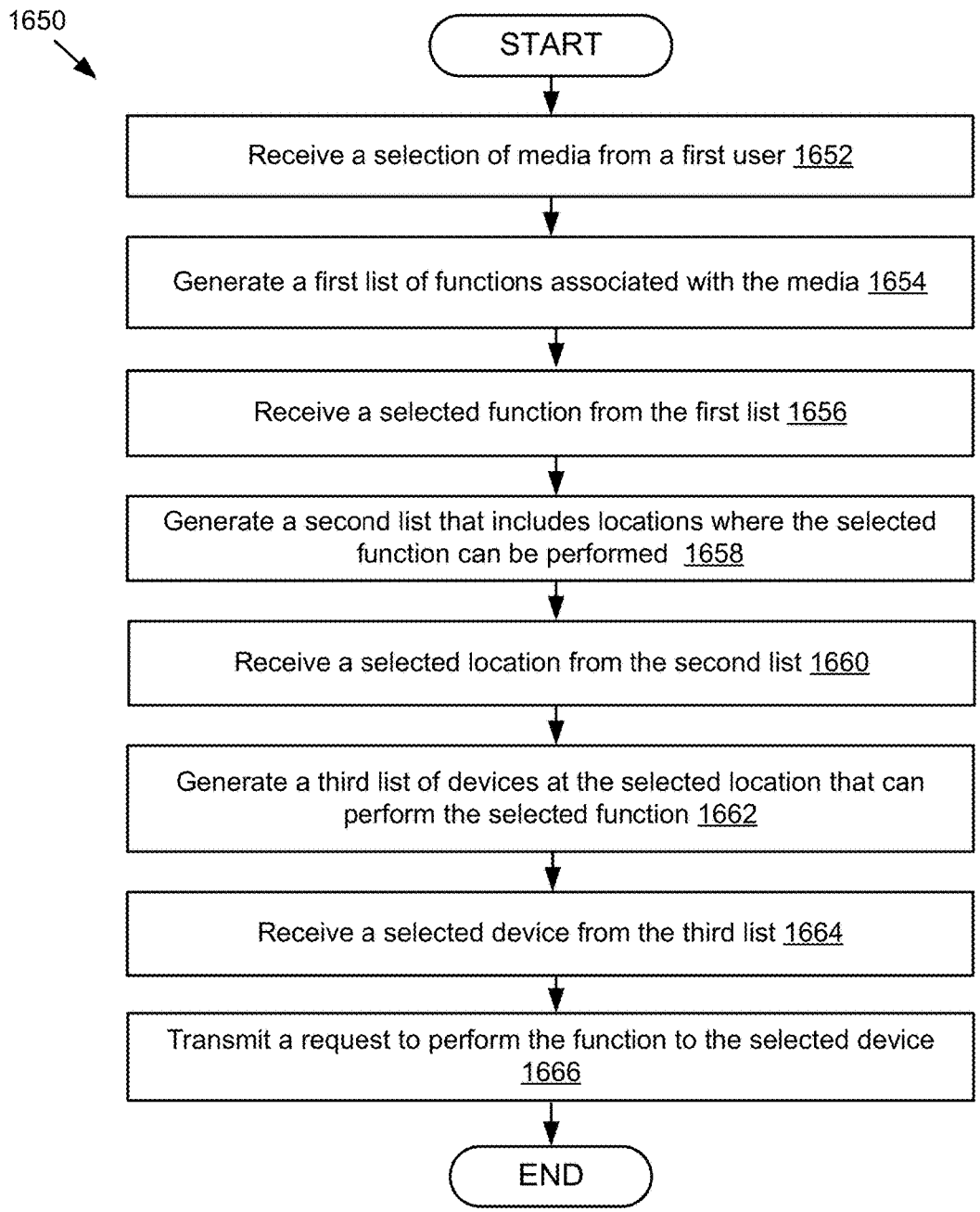
FIG. 16B is a flow diagram of another embodiment of a method for controlling interoperability between different types of devices.

FIG. 16B is a flow diagram 1650 of another embodiment of a method for controlling interoperation between different types of devices by translating requests. The enterprise service bus 107 includes a workflow engine 201 and a device management engine 203. The NAaaS application services 106 include a user management service 211, a device inventory service 265, a location service 299 and device management service 212.

The workflow engine 201 receives 1652 a selection of media from a first user. For example, the user selects an email attachment. The device management engine 203 generates 1654 a first list of functions associated with the media. For example, the user could project the email. The workflow engine 201 transmits the first list to the user. The workflow engine 201 receives 1656 a selected function from the first list. The device management engine 203 instructs the location service 299 to determine the user's location. The device management engine 203 then instructs the location inventory service 299 to generate 1658 a second list that includes locations where the selected function could be performed. For example, the location service 299 generates a list of locations within a threshold distance from the user or the user also provides additional input about a location where the user wants to select a device. The workflow engine 201 transmits the second list to the user. In some embodiments, instead of a list of locations where the selected function can be performed, the second list includes devices within a certain location that can perform the selected function. For example, the device management engine 203 interacts with the device inventory service 265 and the location service 299 to generate a list of collaborative computing devices 130 within the location.

The workflow engine 201 receives 1660 a selected location from the second list. The device management engine 203 instructs the device inventory service 265 and device management service 212 to generate 1662 a third list of devices at the selected location that can perform the selected function. For example, the third list includes devices that are available. The workflow engine 201 transmits the third list to the user. The workflow engine 201 receives 1664 a selected device from the third list. The workflow engine 201 transmits 1666 a request to perform the function to the selected device. For example, the workflow engine 201 transmits a request to project the email attachment to a projector in a conference room.

Figure 17:
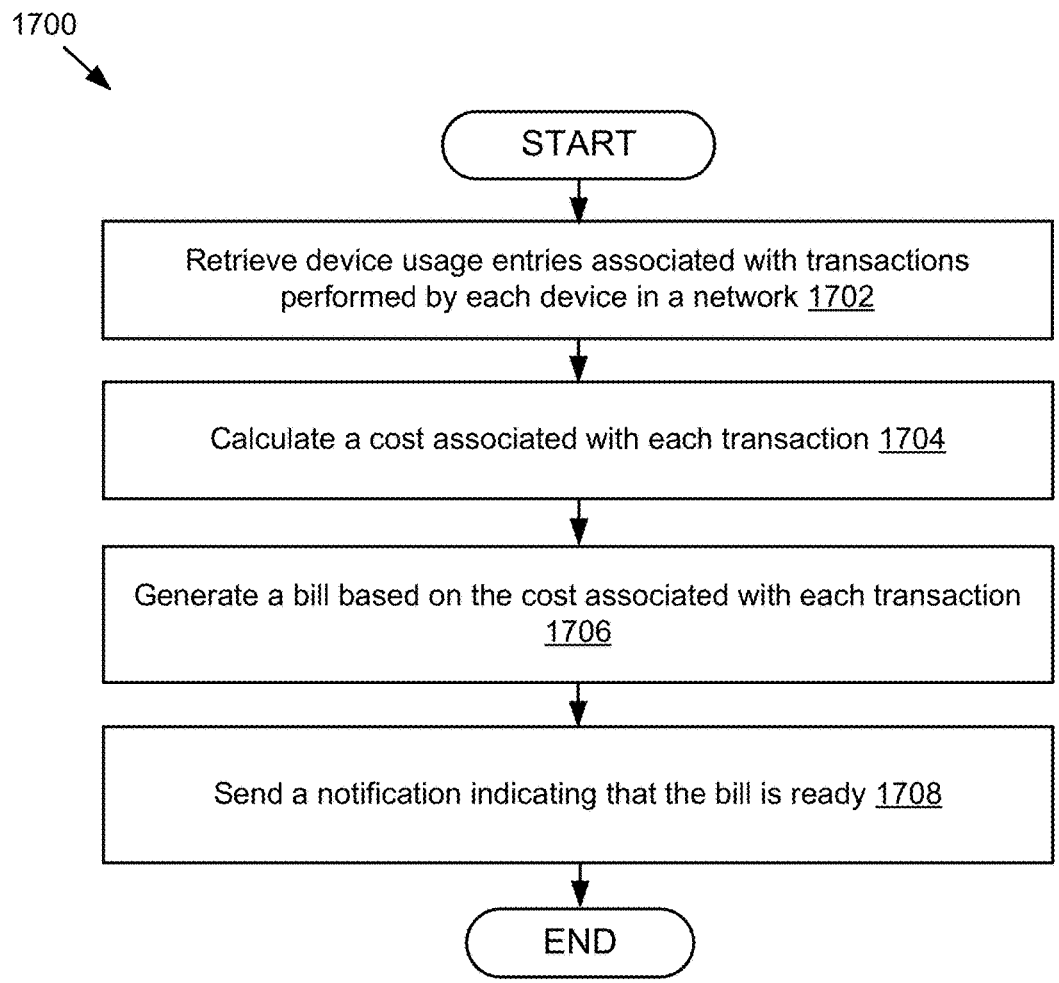
FIG. 17 is a flow diagram of one embodiment of a method for generating a bill based on a cost determined for each transaction performed by a device.

FIG. 17 is a flow diagram 1700 of an embodiment of a method for generating a bill based on a cost determined for each transaction performed by a device. The workflow engine 201 instructs the device usage analytics service 213 to retrieve 1702 device usage entries associated with transactions performed by each device in a network 104 from data storage 268. For example, the device usage analytics service 213 retrieves device usage entries for all transactions requested by a user device 102 in the past month. The workflow engine 201 sends the retrieved data to the billing service 267. The billing service 267 calculates 1704 a cost associated with each transaction and generates 1706 a bill based on the cost associated with each transaction. For example, the billing service 267 determines the cost of using Magnetic Resonance Imaging (MRI) device to image the spine of a patient is 2000 dollars. The notification service 269 sends 1708 a notification indicating the bill is ready. The workflow engine 201 receives the notification and sends the notification to the device or an email account of a user associated with the device.

Figure 18:
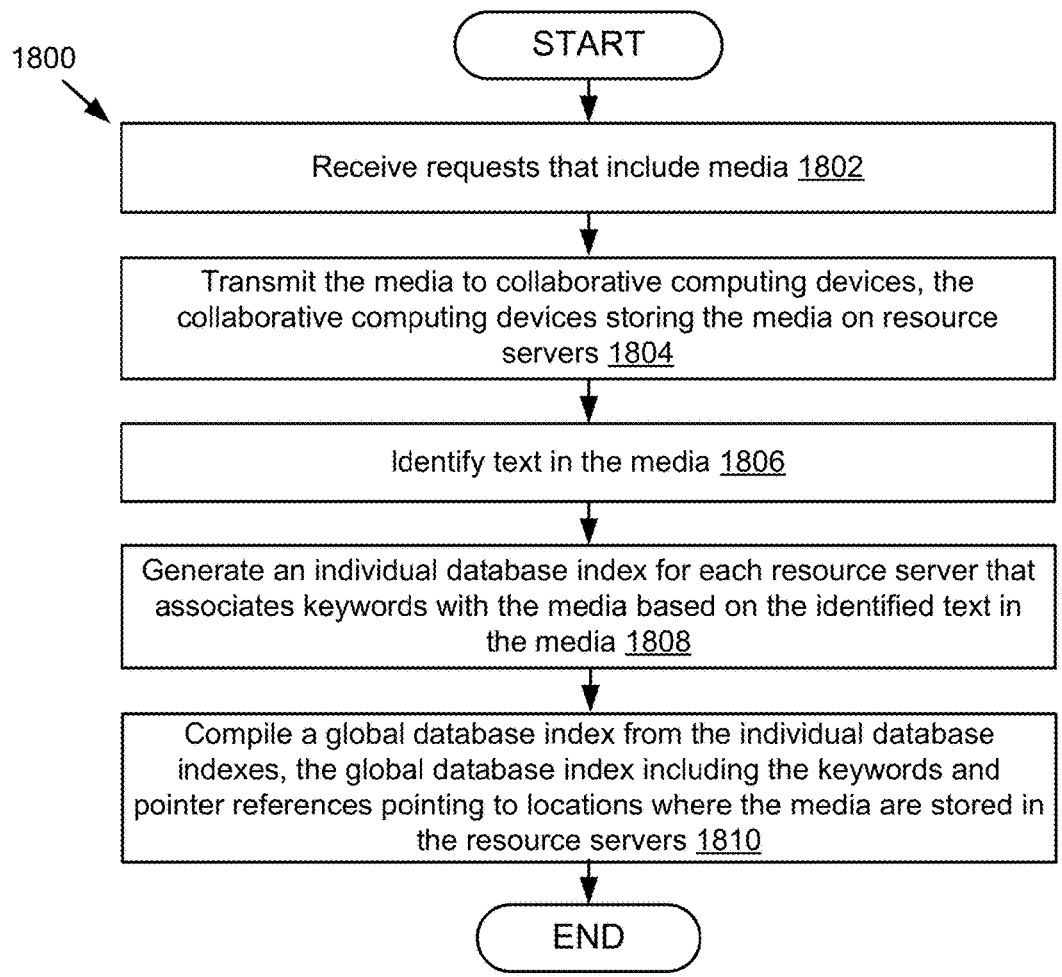
FIG. 18 is a flow diagram of one embodiment of a method for compiling a global database index for one or more resource servers.

FIG. 18 is a flow diagram 1800 of an embodiment of a method for compiling a global database index for one or more resource servers 105a-105n using an enterprise service bus 107 and NAaaS application services 106. The enterprise service bus 107 comprises a workflow engine 201. The NAaaS application services 106 include a media analysis service 217 and an indexing service 287. The workflow engine 201 receives 1802 requests that include media. For example, a user device 102 sends a request to the workflow engine 201 to conduct a video conference with people using a video conferencing device. The workflow engine 201 transmits 1804 the media to collaborative computing devices 103, the collaborative computing devices storing the media on resource servers 105. For example, the workflow engine 201 transmits the video conference data to the video conferencing device and transmits the video conference data to the media analysis service 217 for analysis.

The media analysis service 217 identifies 1806 text in the media, for example, by performing speech-to-text translation. The workflow engine 201 instructs the indexing service 287 to generate 1808 an individual database index for each resource server 105 that associates keywords with the media based on the identified text in the media. The workflow engine 201 instructs the indexing service 287 to compile 1810 a global database index from the individual database indexes, the global database index including the keywords and pointer references pointing to locations where the media are stored in the resource servers 105. For example, the video conference is stored on a resource server associated with the video conferencing device.

Figure 19:
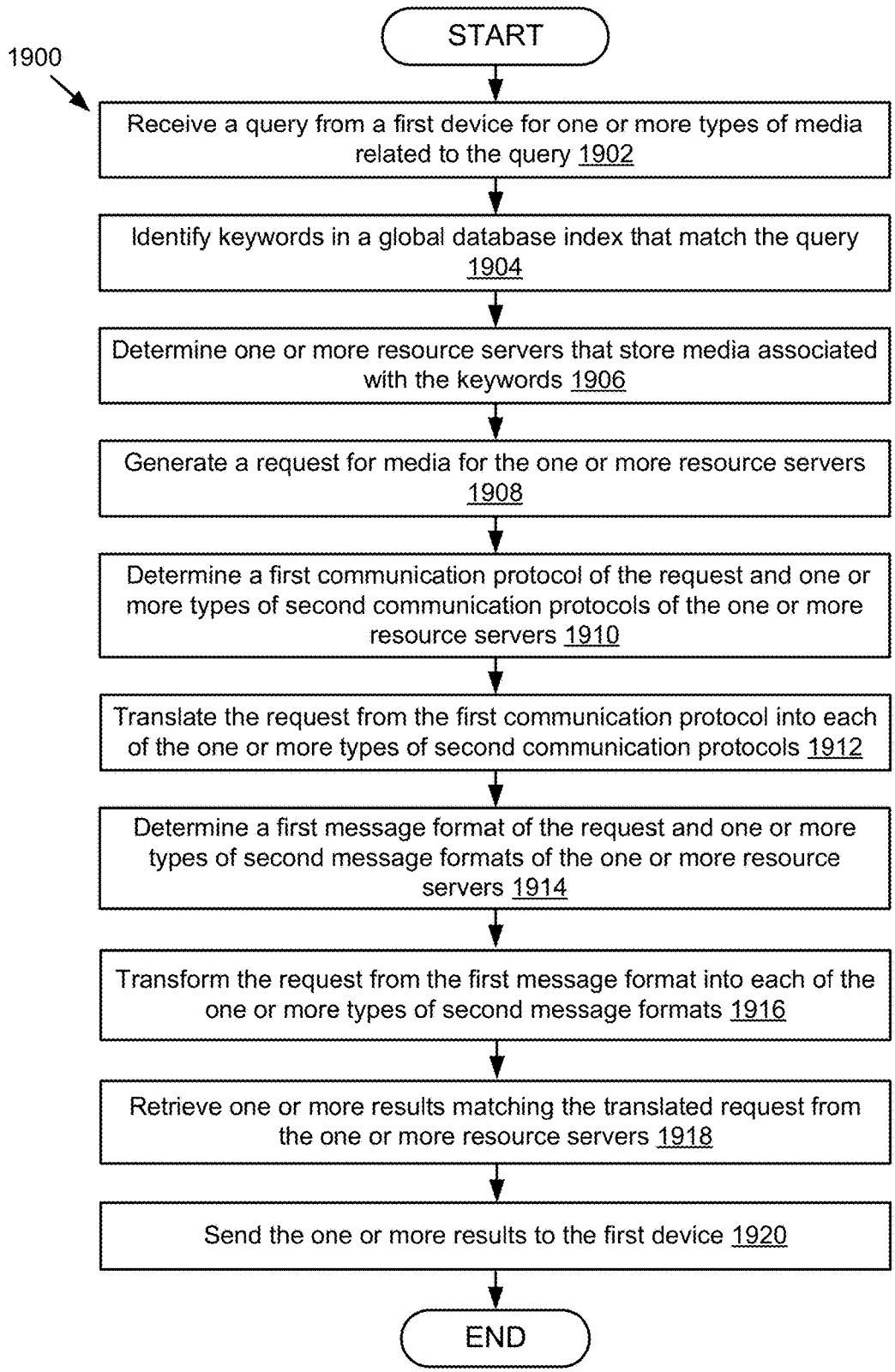
FIG. 19 is a flow diagram of one embodiment of a method for translating a request for one or more resource servers.

FIG. 19 is a flow diagram 1900 of an embodiment of a method for translating a request for one or more resource servers using an enterprise service bus 107 and NAaaS application services 106. The enterprise service bus 107 comprises a workflow engine 201 and a protocol adaption engine 205. The NAaaS services 106 include a search engine 221.

The workflow engine 201 receives 1902 a query from a first device for one or more types of media related to the query. The workflow engine 201 transmits the request to the search engine 221, which identifies 1904 keywords in a global database index that match the query. The workflow engine 201 receives the keywords from the search engine 221 and determines 1906 one or more resource servers 105 that store media associated with the keywords. The workflow engine 201 generates 1908 a request for media for the one or more resource servers 105. If there is a difference between the communication protocol of the request and the communication protocol used by the resource server 105, the workflow engine 201 transmits the request to the protocol adaptation engine 205, which determines 1910 a first communication protocol of the request and one or more types of second communication protocols of the one or more resource servers. The protocol adaptation engine 205 translates 1912 the request from the first communication protocol into each of the one or more types of second communication protocols. If there is a difference between the message format of the request and the message format of the resource server, the message transformation engine 207 determines 1914 a first message format of the request and one or more types of second message formats of the one or more resource servers. The message transformation engine 207 transforms 1916 the request from the first message format into each of the one or more types of second message formats. The workflow engine 201 retrieves 1918 one or more results matching the translated request from the one or more resource servers 105 and sends 1920 the one or more results to the first device.

Figure 20:
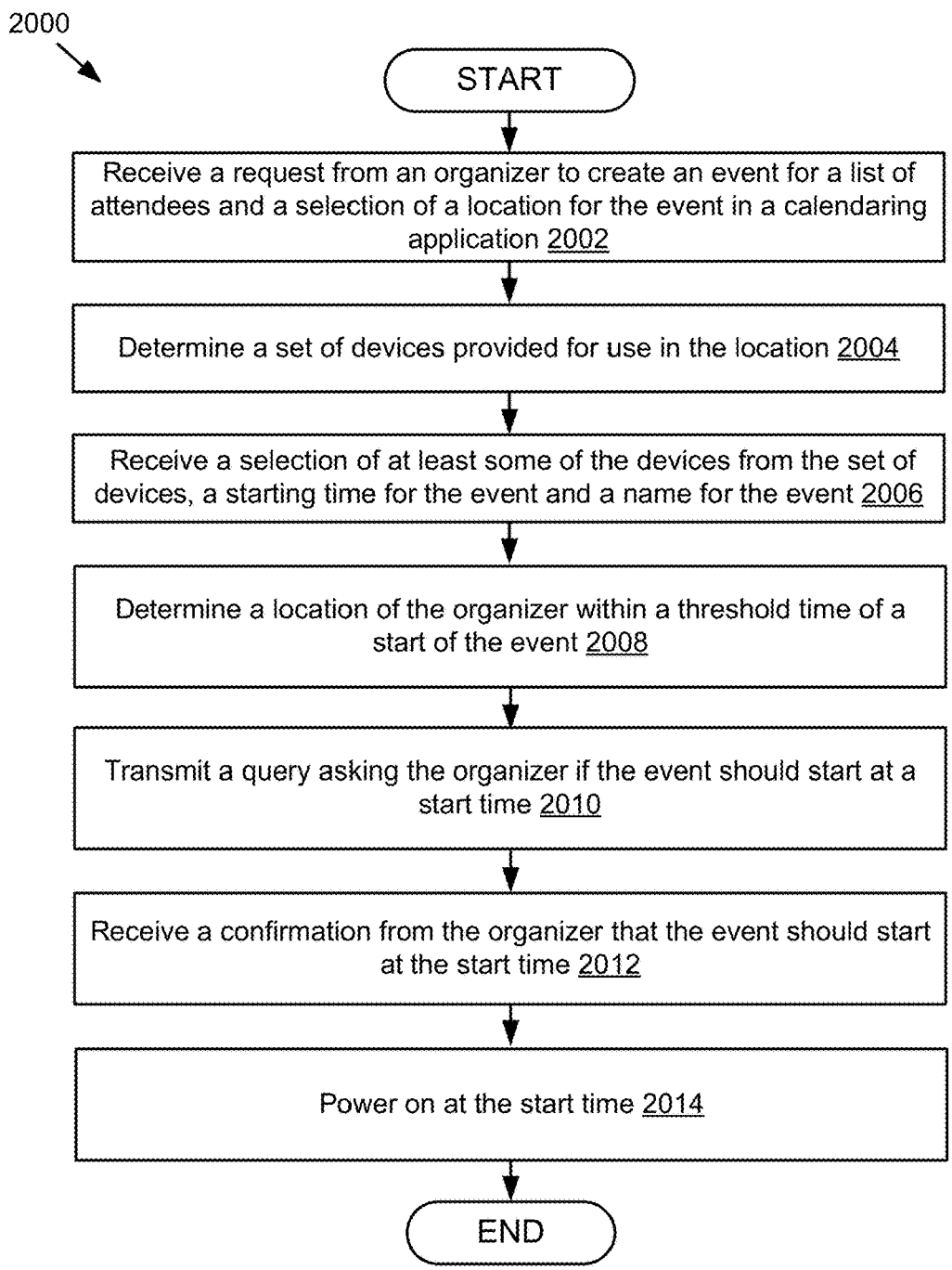
FIG. 20 is a flow diagram of one embodiment of a method for controlling one or more devices reserved for a calendar event.

FIG. 20 is a flow diagram 2000 of an embodiment of a method for controlling one or more devices reserved for a calendar event using an enterprise service bus 107 and NAaaS application services 106. The enterprise service bus 107 comprises a workflow engine 201 and a device management engine 203. The NAaaS application services 106 comprise a calendar module 286, a device inventory service 265, a device management service 212 and a notification service 269.

The calendar module 286 receives 2002, via the workflow engine 201, a request from an organizer to create an event for a list of attendees and a selection of a location for the event in a calendaring application. The workflow engine 201 transmits the selected location to the device management engine 203 in the enterprise service bus 107. The device management engine 203 instructs the device inventory service 265 to determine 2004 a set of devices provided for use in the location. For example, the user specifies that the event takes place in a conference room in Menlo Park, Calif., but users will also join from a conference room in Tokyo, Japan. Further details for selecting the location can be found above with reference to FIGS. 16A and 16B. The workflow engine 201 receives a selection of at least some of the devices from the set of devices, a starting time and end time for the event and a name for the event. The device management engine 203 determines 2008 a location of the organizer's device within a threshold time of a start of the event. The workflow engine 201 transmits 2010 a query asking the organizer if the event should start at a start time. For example, the workflow engine 201 transmits the query five minutes before the event is scheduled to ask the organizer if the event should start at the scheduled time. The query is generated by the notification service 269 and received by the workflow engine 201. The workflow engine 201 instructs the calendar module 286 to receive 2012 a confirmation from the organizer that the event should start at the same time. The device management engine 203 instructs the set of devices to power on for use at the start time. For example, the device management engine 203 instructs the set of devices five minutes before the start time of the event.

Figure 21:
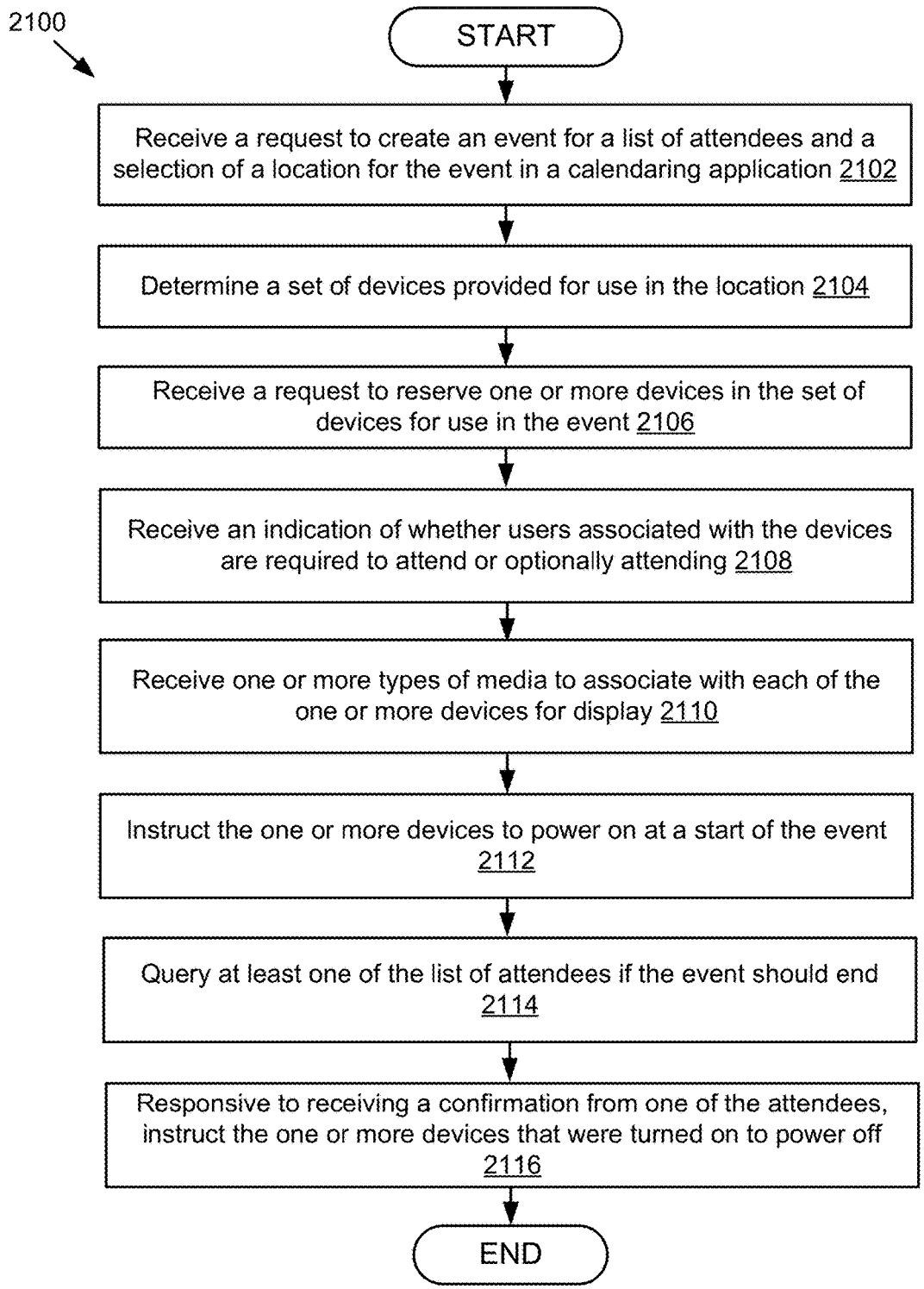
FIG. 21 is a flow diagram of another embodiment of a method for controlling one or more devices reserved for a calendar event.

FIG. 21 is a flow diagram of another embodiment of a method for controlling one or more devices reserved for a calendar event using an enterprise service bus 107 and NAaaS application services 106. The enterprise service bus 107 comprises a workflow engine 201. The NAaaS application services 106 comprise a calendar module 286, a device inventory service 265, a device management service 212 and a notification service 269.

The workflow engine 201 instructs the calendar module 286 to receive 2102 a request to create an event for a list of attendees and a selection of a location for the event in a calendaring application. For example, the location is Conference Room 201B in Building A. The organizer also sets the start time and end time for the event. The workflow engine 201 instructs the device inventory service 265 to determine 2104 a set of devices provided for use in the location. The workflow engine 201 receives 2106 a request to reserve one or more devices in the set of devices provided for use in the event. The workflow engine 201 receives 2108 an indication of whether users associated with the device are required to attend or optionally attending. The workflow engine 201 instructs the media repository service 215 to receive 2110 one or more types of media to associate with each of the one or more devices for display. The workflow engine 201 instructs 2112 the one or more devices to power on at a start of the event. Around the end of the event, for example, five minutes before the event is scheduled to end, the workflow engine 201 instructs the notification service 269 to generate a notification asking if the event should end. Optionally, the workflow engine 201 receives the notification and queries 2114 at least one of the list of attendees if the event should end and responsive to receiving a confirmation from one of the attendees the workflow engine 201 instructs 2116 the one or more devices that were turned on to power off.

Figure 22:
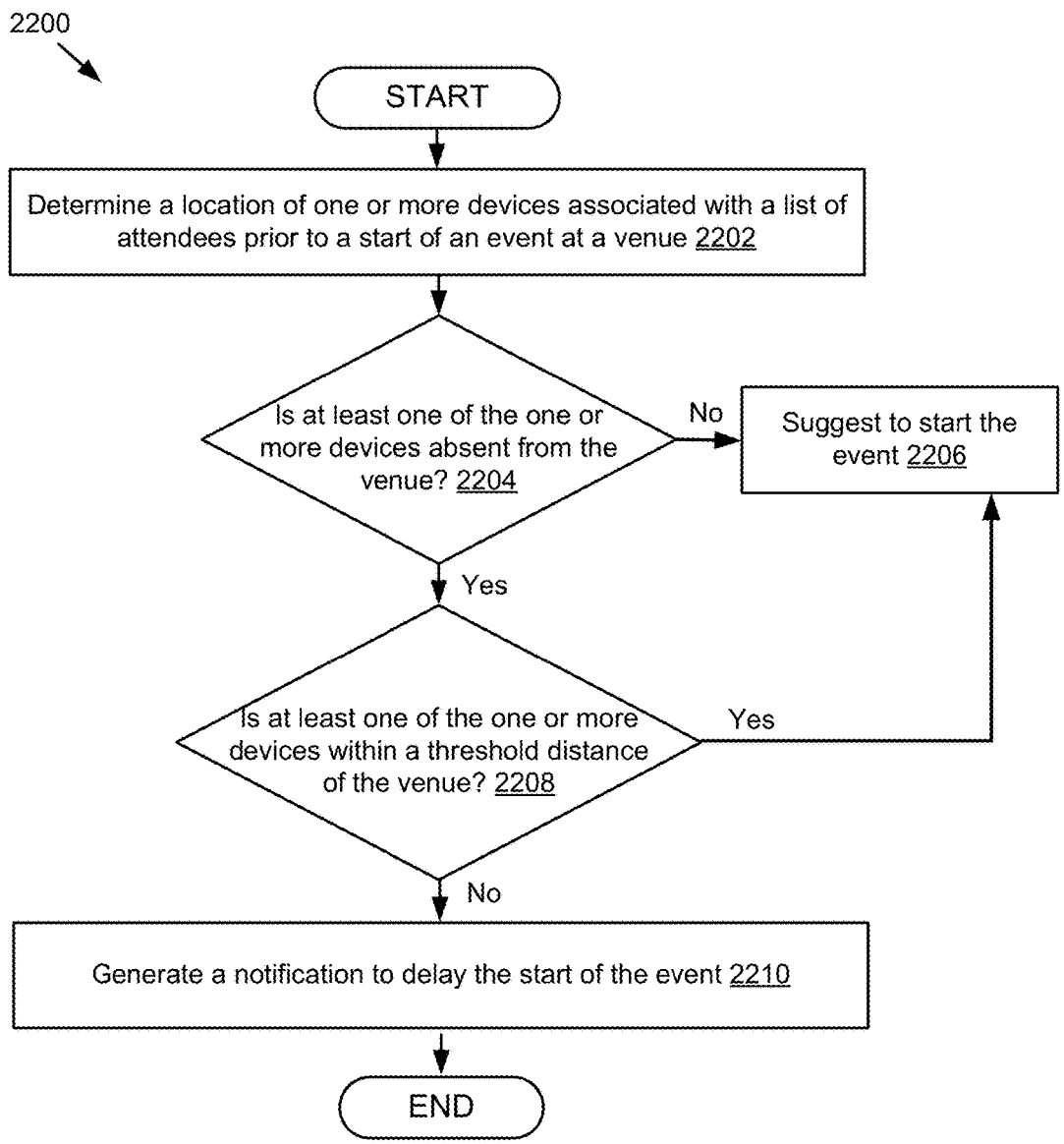
FIG. 22 is a flow diagram of one embodiment of a method for generating one or more notifications for a calendar event.

FIG. 22 a flow diagram of an embodiment of a method for generating one or more notifications for a calendar event using an enterprise service bus 107 and NAaaS application services 106. The enterprise service bus 107 comprises a workflow engine 201 and a device management engine 203. The NAaaS application services 106 comprise a notification service 269. The device management engine 203 determines 2202 a location of one or more devices associated with a list of attendees prior to a start of an event at a venue. The device management engine 203 checks 2204 whether at least one or more devices absent from the venue. If at least one of the one or more devices is absent from the venue, the device management engine 203 checks 2208 whether at least one of the one or more devices within a threshold distance of the venue. The threshold can be a preset default, defined by an organizer of the event, etc.

If at least one of the one or more devices is not absent from the venue, the device management engine 203 instructs the notification service 269 to suggest 2206 to start the event. In some embodiments, the device management engine 203 checks the identity of the user associated with the device that is absent. If the presence of the user is not important to the event, the device management engine 203 instructs the notification service 269 to suggest 2206 to start the event. For example, as referenced in FIG. 21, the user that created the event specifies mandatory attendance for some of the attendees and optional attendance for other attendees. If the user is one of the optional attendees, the event can start.

If at least one of the one or more devices within a threshold distance of the venue, the device management engine 203 instructs the notification service 269 to suggest 2206 to start the event. If at least one of the one or more devices is not within a threshold distance of the venue, the device management engine 203 instructs the notification service 269 to generate 2210 a notification to delay the start of the event.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:

receiving, using one or more computing devices, a query from a first device for media, the query including one or more terms related to a topic;

identifying, using the one or more computing devices, a global database index, the global database index including keywords and an association between the keywords and one or more resource servers corresponding to one or more types of media presentation devices, the one or more resource servers storing one or more media associated with the keywords;

matching, using the one or more computing devices, the one or more terms in the query with the keywords in the global database index;

determining, using the one or more computing devices, a resource server corresponding to a type of media presentation device based on matching the one or more terms in the query with the keywords in the global database index, the resource server previously receiving the media from the type of media presentation device and storing the media and a device usage entry associated with the type of media presentation device in response to the media having been sent to and presented on the type of media presentation device;

generating, using the one or more computing devices, a request for retrieving the media from the resource server;

sending, using the one or more computing devices, the request to the resource server;

retrieving, using the one or more computing devices, the media from the resource server based on the request; and sending, using the one or more computing devices, the media to the first device.

2. The method of claim 1, wherein generating the request for retrieving the media from the resource server comprises:

determining, using the one or more computing devices, a first communication protocol of the query and a second communication protocol of the resource server;

translating, using the one or more computing devices, the query from the first communication protocol into the second communication protocol;

determining, using the one or more computing devices, a first message format of the query and a second message format of the resource server;

transforming, using the one or more computing devices, the query from the first message format into the second message format; and generating, using the one or more computing devices, the request using the second communication protocol and the second message format.

3. The method of claim 2, wherein the first communication protocol is a Hypertext Transfer Protocol (HTTP) and the second communication protocol is a Transmission Control Protocol (TCP).

4. The method of claim 1, wherein identifying the global database index comprises:
  determining an individual database index for each corresponding resource server of the one or more resource servers, the individual database index associating the keywords with the one or more media based on identified text in the one or more media; and
  determining the global database index compiled based on the individual database index for each corresponding resource server, the global database index including the keywords and pointer references pointing to locations where the one or more media are stored in the corresponding resource servers.

5. The method of claim 4, wherein determining the individual database index for each corresponding resource server further comprises:
  determining a weight for the keywords based on a location and a number of times each keyword appears in the media; and
  selecting a top number of keywords based on the weight for the keywords.

6. The method of claim 1, further comprising updating the global database index with updates occurring in the corresponding resource servers, the updates include one or more of storing, deleting and moving the one or more media.

7. The method of claim 1, wherein the device usage entry includes one from a group of a user identifier, an employer identifier, a device type, a device identifier, an internet protocol (IP) address, a location, a media type, a title and a date of media submission.

8. The method of claim 1, wherein the resource server receives the media from a second device, the second device transmitting the media for presentation on the type of media presentation device.

9. A system comprising:
  one or more processors;
  an enterprise service bus stored on a memory and executable by the one or more processors, the enterprise service bus configured to receive a query from a first device for media, the query including one or more terms related to a topic, to transmit the query to application services, to receive a determination of a resource server, to generate a request for retrieving the media from the resource server, to send the request to the resource server, to retrieve the media from the resource server based on the request, and to send the media to the first device; and
  application services stored on the memory and executable by the one or more processors, the application services configured to receive the query from the enterprise service bus, to identify a global database index including keywords and one or more resource servers corresponding to one or more types of media presentation devices, the one or more resource servers storing one or more media associated with the keywords, to match the one or more terms in the query with the keywords in the global database index, to determine the resource server corresponding to a type of media presentation device based on matching the one or more terms in the query with the keywords in the global database index, the resource server previously receiving the media from the type of media presentation device and storing the media and a device usage entry associated with the type of media presentation device in response to the media having been sent to and presented on the type of media presentation device, and to send the determination of the resource server to the enterprise service bus.

10. The system of claim 9,
  wherein to generate the request for retrieving the media from the resource server, the enterprise service bus is further configured to:
    determine a first communication protocol of the query and a second communication protocol of the resource server, translate the query from the first communication protocol into the second communication protocol, determine a first message format of the query and of a second message format of the resource server, transform the query from the first message format into the second message format, and generate the request using the second communication protocol and the second message format.

11. The system of claim 9,
  wherein to identify the global database index, the enterprise service bus is further configured to:
    determine an individual database index for each corresponding resource server of the one or more resource servers, the individual database index associating the keywords with the one or more media based on identified text in the one or more media and determine the global database index compiled based on the individual database index for each corresponding resource server, the global database index including the keywords and pointer references pointing to locations where the one or more media are stored in the corresponding resource servers.

12. The system of claim 11,
  wherein to determine the individual database index for each corresponding server, the application services are further configured to determine a weight for the keywords based on a location and a number of times each keyword appears in the media and select a top number of keywords based on the weight for the keywords.

13. The system of claim 9, further comprising updating the global database index with updates occurring in the corresponding resource servers, the updates include one or more of storing, deleting and moving the one or more media.

14. The system of claim 9, wherein the device usage entry includes one from a group of a user identifier, an employer identifier, a device type, a device identifier, an internet protocol (IP) address, a location, a media type, a title and a date of media submission.

15. The system of claim 9, wherein the application services are further configured to receive the media from a second device, the second device transmitting the media for presentation on the type of media presentation device.

16. A computer program product comprising a non-transitory computer usable medium including a computer readable program, wherein the computer readable program when executed on a computer causes the computer to:
  receive a query from a first device for media, the query including one or more terms related to a topic;
  identify a global database index, the global database index including keywords and an association between the keywords and one or more resource servers corresponding to one or more types of media presentation devices, the one or more resource servers storing one or more media associated with the keywords;
  match the one or more terms in the query with the keywords in the global database index;

determine a resource server corresponding to a type of media presentation device based on matching the one or more terms in the query with the keywords in the global database index, the resource server previously receiving the media from the type of media presentation device and storing the media and a device usage entry associated with the type of media presentation device in response to the media having been sent to and presented on the type of media presentation device;

generate a request for retrieving the media from the resource server;

send the request to the resource server;

retrieve the media from the resource server based on the request; and send the media to the first device.

17. The computer program product of claim 16, wherein to generate the request for retrieving the media from the resource server, the computer program further causes the computer to:

determine a first communication protocol of the query and a second communication protocol of the resource server;

translate the query from the first communication protocol into the second communication protocol;

determine a first message format of the query and a second message format of the resource server;

transform the query from the first message format into the second message format; and generate the request using the second communication protocol and the second message format.

18. The computer program product of claim 16, wherein to identify the global database index, the computer program further causes the computer to:

determine an individual database index for each corresponding resource server of the one or more resource servers, the individual database index associating the keywords with the one or more media based on identified text in the one or more media; and determine the global database index compiled based on the individual database index for each corresponding resource server, the global database index including the keywords pointing to locations where the one or more media are stored in the corresponding resource servers.

19. The computer program product of claim 18, wherein to determine the individual database index for each corresponding resource server, the computer program further causes the computer to:

determine a weight for the keywords based on a location and a number of times each keyword appears in the media; and select a top number of keywords based on the weight for the keywords.

20. The computer program product of claim 16, wherein the device usage entry includes one from a group of a user identifier, an employer identifier, a device type, a device identifier, an internet protocol (IP) address, a location, a media type, a title and a date of media submission.

* * * * *